(12) United States Patent
Miyamoto et al.

(10) Patent No.: US 8,107,331 B2
(45) Date of Patent: Jan. 31, 2012

(54) OPTICAL DISK APPARATUS, POSITION CONTROL METHOD, AND OPTICAL PICKUP

(75) Inventors: Hirotaka Miyamoto, Kanagawa (JP); Kimihiro Saito, Saitama (JP); Goro Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 472 days.

(21) Appl. No.: 12/336,031

(22) Filed: Dec. 16, 2008

(65) Prior Publication Data

US 2009/0168632 A1 Jul. 2, 2009

(30) Foreign Application Priority Data

Dec. 28, 2007 (JP) ................. 2007-341371

(51) Int. Cl.
*G11B 7/00* (2006.01)
(52) U.S. Cl. ............................. 369/44.37
(58) Field of Classification Search .......... None
See application file for complete search history.

(56) References Cited

U.S. PATENT DOCUMENTS

| 5,856,959 | A * | 1/1999 | Yanagisawa | 369/44.23 |
|---|---|---|---|---|
| 7,193,953 | B2 | 3/2007 | Kim | |
| 7,706,233 | B2 | 4/2010 | Horimai et al. | |
| 2009/0147652 | A1 | 6/2009 | Fujita | |
| 2009/0285059 | A1 | 11/2009 | Fujita et al. | |
| 2010/0027403 | A1 | 2/2010 | Fujita et al. | |
| 2010/0046345 | A1 | 2/2010 | Fujita et al. | |

FOREIGN PATENT DOCUMENTS

| JP | 62-020147 | | 1/1987 |
|---|---|---|---|
| JP | 04-321934 | A | 11/1992 |
| JP | 10-064104 | A | 3/1998 |
| JP | 10-308033 | A | 11/1998 |
| JP | 11-296875 | A | 10/1999 |
| JP | 11-328724 | A | 11/1999 |
| JP | 2000-163795 | A | 6/2000 |
| JP | 2001-325748 | A | 11/2001 |
| JP | 2002-334433 | A | 11/2002 |
| JP | 2003-077157 | A | 3/2003 |
| JP | 2003-132586 | A | 5/2003 |
| JP | 2003-217142 | A | 7/2003 |
| JP | 2005-037658 | A | 2/2005 |
| JP | 2007-042149 | A | 2/2007 |
| JP | 2007-179676 | A | 7/2007 |
| JP | 2007-287245 | A | 11/2007 |
| JP | 2008-017433 | A | 1/2008 |
| JP | 2008-071433 | A | 3/2008 |
| WO | WO 2006/111972 | A2 | 10/2006 |

OTHER PUBLICATIONS

Toriumi et al., "Reflection confocal microscope readout system for three-dimensional photochromic optical data storage", Optics Letters, vol. 23, Issue 24, pp. 1924-1926 (1998).

* cited by examiner

*Primary Examiner* — Wayne Young
*Assistant Examiner* — Brian Butcher
(74) *Attorney, Agent, or Firm* — Wolf, Greenfield & Sacks, P.C.

(57) ABSTRACT

An optical disk apparatus appropriately adjusts the optical paths of a reference light beam and information light beam in an optical path forming section of an optical pickup, condenses the reference light beam and information light beam using an objective lens, and performs position control of the objective lens in the focusing and tracking directions so as to focus the reference light beam onto a reference track in a target mark layer, thereby focusing the focal point of the information light beam condensed by the objective lens onto a target track TG in the target mark layer.

10 Claims, 17 Drawing Sheets

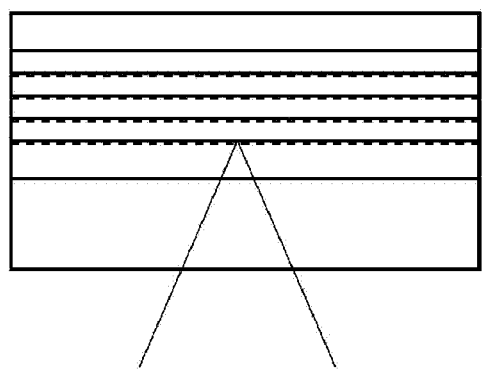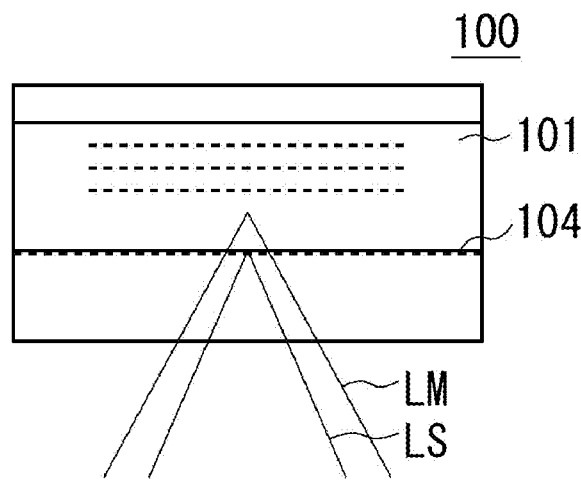
FIG. 1A  FIG. 1B
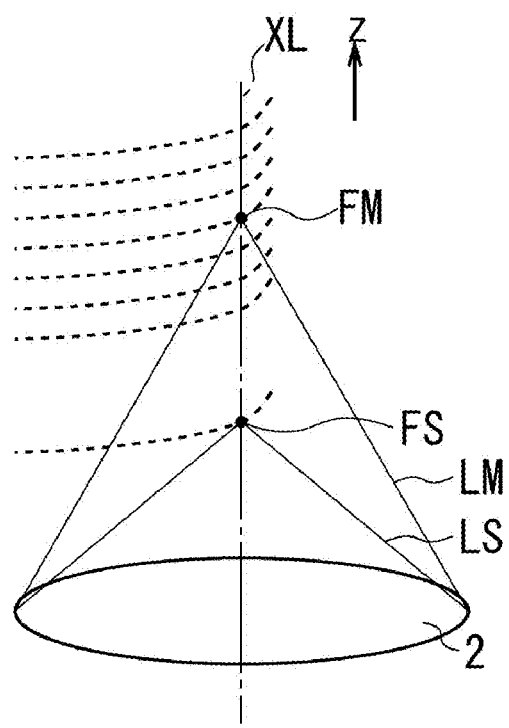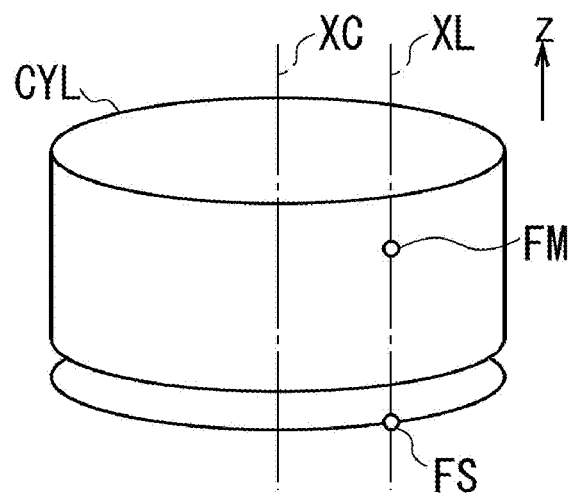
FIG. 2A  FIG. 2B

166

OPTICAL DISK APPARATUS, POSITION CONTROL METHOD, AND OPTICAL PICKUP

CROSS REFERENCES TO RELATED APPLICATIONS

The present invention contains subject matter related to Japanese Patent Application JP2007-341371 filed in the Japanese Patent Office on Dec. 28, 2007, the entire contents of which being incorporated herein by reference.

BACKGROUND OF THE INVENTION

1. Field of the Invention

The present invention relates to an optical disc apparatus, a position control method and an optical pickup. The present invention provides a technique that can suitably be applied to an optical disc apparatus for recording information on a plurality of layers of an optical disc.

2. Description of the Related Art

Known popular optical disc apparatus are mostly designed to irradiate a light beam on an optical disc such as a compact disc (CD), a digital versatile disc (DVD) or a Blu-ray disc (registered trademark, to be referred to as "BD" hereinafter) and reproduce information by reading the reflected light beam.

Such known popular optical disc apparatus are also designed to record information on an optical disc by irradiating a light beam onto the optical disc and changing the local reflectance or the like of the optical disc.

As for such optical discs, it is known that the size of the light spot to be formed on the optical disc is defined approximately by $\lambda$/NA ($\lambda$: wavelength of light beam, NA: numerical aperture) and the resolution is proportional to the size of the light spot. For instance, with the BD system, about 25 GB of data can be recorded on an optical disc having a diameter of 120 mm.

Meanwhile, various pieces of information are recorded on optical discs. Information that can be recorded on optical discs includes audio contents, video contents and various computer data. Particularly, in recent years, the quantity of information to be recorded on an optical disc has rapidly grown because of an increasing demand for high definition images and high quality sounds and the increased number of sets of contents to be recorded on an optical disc so that optical discs are by turn required to have a large recording capacity.

We consider here that a plurality of recording layers is provided on one optical disk. In the case where an optical disk is formed by laminating layers (reflecting layer, recording layer, and the like) made of different materials as shown in FIG. 1A, which has been done in a conventional DVD system and BD system, manufacturing process becomes complicated, leading to increased cost.

Thus, there is proposed an optical disk apparatus that records information while laminating a plurality of layers of a recording mark (hereinafter, referred to as "mark layer") in a uniform recording layer of an optical disk so as to increase a recording capacity (refer to, e.g., Jpn. Pat. Appln. Laid-Open Publication No. 2007-220206 (FIGS. 1, 4, and 5)).

As shown in FIG. 1B, an optical disk 100 that accepts the optical disk apparatus having the above configuration has a uniform recording layer 101. That is, there exists no mark for position identification in the recording layer. Therefore, in the optical disk 100, a reference layer 104 having a track and the like is provided.

In this case, the optical disk apparatus focuses a predetermined servo light beam LS onto a reference track (hereinafter, referred to as "track TE") of the reference layer 104 to cause an information light beam LM having an optical axis XL coinciding with the optical axis of the servo light beam LS to focus onto a target position (hereinafter referred to as "target position PG") in the recording layer 101.

SUMMARY OF THE INVENTION

The optical disk apparatus having the above configuration performs recording/reproduction of information while associating the reference track of the reference layer 104 with tracks of respective mark layers, as shown in FIG. 2A. Therefore, the optical disk 100 forms a virtual cylinder CYL as shown in FIG. 2B in the recording layer 101 by the tracks of the respective mark layers corresponding to a given reference track.

If the optical disk 100 is in an ideal state, a central axis XC of the cylinder CYL is parallel to the optical axis XL.

However, in the optical disk apparatus, there is a possibility that the optical disk 100 is attached in an inclined manner, or there is a possibility that warpage of the optical disk 100 itself occurs. In such a case, the central axis XC of the cylinder CYL will not be parallel to the optical axis XL as shown in FIG. 3A.

Actually, there is a possibility that the optical disk apparatus gives an individual inclination to the optical disk 100 at its attachment time due to individual difference and the like of the optical disk apparatus. Further, there is a possibility that the degree of the inclination slightly changes every chucking operation in a chucking mechanism for the optical disk 100. Furthermore, there is a possibility that the degree of the warpage of the optical disk 100 gradually changes with age.

Therefore, in the case where the optical disk apparatus performs a second recording operation for the optical disk 100 for which a first recording operation has been performed while forming a new track continuously from an information recorded track, the inclination of the central axis XC of the cylinder CYL relative to the optical axis XL may change between the first recording time and second recording time.

Further, there is a possibility that the optical axes of the servo light beam LS and information light beam LM are misaligned with each other, or that a center XD of the optical disk 100 and a rotational center XT of a spindle motor and the like on the optical disk apparatus side are misaligned with each other. In such a case, the central axis XC of the cylinder CYL moves in parallel as shown in FIG. 3B.

Further, the optical disk 100 deteriorates with age due to characteristics of the recording layer 101 and therefore may contract as shown in FIG. 3C, causing the distance between the lower bottom surface of the cylinder CYL and upper bottom surface to change.

In this case, when the distance between a focal point FS of the servo light beam LS and a focal point FM of the information light beam LM is set in a simple manner, the focal point FM is not focused onto the target position PG but onto another mark layer.

In the above respective cases, there is a possibility that the optical disk apparatus forms a new area AR2 while overwriting information onto an information recorded area AR1. That is, there is a possibility that the optical disk apparatus overwrites a new track onto the information recorded track due to the warpage or inclination of the optical disk 100 to erroneously erase the recorded information.

The present invention has been made in view of the above points, and is intended to provide an optical disk apparatus, a position control method, and an optical pickup capable of increasing the positional accuracy of recording marks formed in a uniform recording layer of an optical disk.

According to a first aspect of the present invention, there is provided an optical disk apparatus including: an objective lens that condenses, onto a uniform recording layer in an optical disk, an information light beam for recording or reproducing information in or from the optical disk on which a concentric or spiral shaped track is formed in the recording layer by recording marks each representing the information and a reference light beam to be irradiated onto a reference track that has been formed on the optical disk; an optical path forming section that forms the optical paths of the information light beam and reference light beam which are allowed to enter the objective lens such that the distance between the objective lens and focal point of the reference light beam and distance between the objective lens and focal point of the information light beam are equal to each other in the optical axis direction of the information light beam and that the focal points of the information light beam and reference light beam are away from each other in the radius direction of the optical disk by a distance corresponding to the total width of a predetermined number of tracks; and a position control section that controls the position of the objective lens so as to focus the reference light beam onto the reference track.

With the above configuration, the optical disk apparatus according to the first aspect of the present invention can focus the information light beam onto a track away from the reference track by a distance corresponding to the total width of a predetermined number of tracks simply by focusing the focal point of the reference light beam onto the existing reference track.

According to a second aspect of the present invention, there is provided a position control method including: an optical path forming step of forming the optical paths of information light beam for recording or reproducing information in or from an optical disk on which a concentric or spiral shaped track is formed in a uniform recording layer by recording marks each representing the information and a reference light beam to be irradiated onto a reference track that has been formed on the optical disk so as to allow the information light beams and reference light beam to enter a predetermined objective lens; a condensing step of condensing the information light beam and reference light beam using the objective lens such that the distance between the objective lens and focal point of the reference light beam and distance between the objective lens and focal point of the information light beam in the optical axis direction of the information light beam are equal to each other and that the focal points of the information light beam and reference light beam are away from each other in the radius direction of the optical disk by a distance corresponding to a predetermined number of tracks; and a position control step of controlling the position of the objective lens so as to focus the reference light beam condensed by the objective lens onto the reference track.

With the above configuration, the position control method according to the second aspect of the present invention can focus the information light beam onto a track away from the reference track by a distance corresponding to the total width of a predetermined number of tracks simply by focusing the focal point of the reference light beam onto the existing reference track.

According to a third aspect of the present invention, there is provided an optical pickup including: an objective lens that condenses, onto a uniform recording layer in an optical disk, an information light beam for recording or reproducing information in or from the optical disk on which a concentric or spiral shaped track is formed in the recording layer by recording marks each representing the information and a reference light beam to be irradiated onto a reference track that has been formed on the optical disk; an optical path forming section that forms the optical paths of the information light beam and reference light beam which are allowed to enter the objective lens such that the distance between the objective lens and focal point of the reference light beam and distance between the objective lens and focal point of the information light beam are equal to each other in the optical axis direction of the information light beam and that the focal points of the information light beam and reference light beam are away from each other in the radius direction of the optical disk by a distance corresponding to the total width of a predetermined number of tracks; and a reference light reception section that receives a reflected reference light beam which is obtained when the reference light beam is reflected by the reference track and allows a predetermined position control section to perform position control of the objective lens so as to focus the reference light beam onto the reference track based on the reception result of the reflected reference light beam.

With the above configuration, the optical pickup according to the third aspect of the present invention can focus the information light beam onto a track away from the reference track by a distance corresponding to the total width of a predetermined number of tracks simply by focusing the focal point of the reference light beam onto the existing reference track using a predetermined position control section.

According to the present invention, it is possible to focus the information light beam onto a track away from the reference track by a distance corresponding to the total width of a predetermined number of tracks simply by focusing the focal point of the reference light beam onto the existing reference track. As a result, an optical disk apparatus and a position control method capable of increasing the positional accuracy of recording marks formed in a uniform recording layer of an optical disk can be realized.

Further, according to the present invention, it is possible to focus the information light beam onto a track away from the reference track by a distance corresponding to the total width of a predetermined number of tracks simply by focusing the focal point of the reference light beam onto the existing reference track using a predetermined position control section. As a result, an optical pickup capable of increasing the positional accuracy of recording marks formed in a uniform recording layer of an optical disk can be realized.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 1A and 1B are schematic cross-sectional views showing a configuration of a recording layer in an optical disk;

FIGS. 2A and 2B are schematic views showing a state where a track forms a virtual cylinder;

DETAILED DESCRIPTION OF THE PREFERRED EMBODIMENTS

Embodiments of the present invention will be described in detail below with reference to the accompanying drawings.

(1) First Embodiment

(1-1) Basic Principle of Focus Position Control

The basic principle of focus position control according to a first embodiment will be described. In the first embodiment, an optical disk apparatus 10 irradiates an optical disk 100 with an information light beam LM to record information in the optical disk 100 and detects a reflected information light beam LM which is the reflected light of the information light beam LM to read out information from the optical disk 100.

Figure 5:
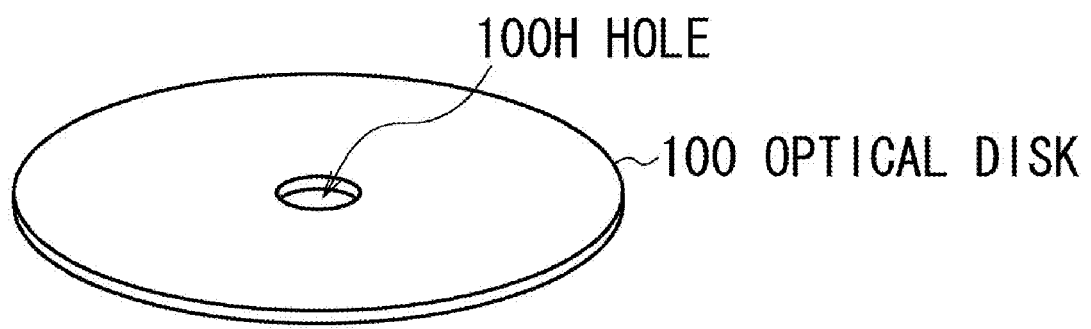
FIG. 5 is a schematic perspective view showing an exterior configuration of an optical disk.

As shown in the external view of FIG. 5, the optical disk 100 is formed into substantially a disk shape as a whole and has a hole 100H for chucking provided in the center thereof. Further, as shown in the cross-sectional view of FIG. 6, the optical disk 100 has a structure in which a recording layer 101 for information recording is sandwiched between substrates 102 and 103.

The optical disk apparatus 10 condenses, using an objective lens 18, the information light beam LM emitted from a predetermined light source in the recording layer 101 of the optical disk 100. In the case where the information light beam LM has strength for recording which is comparatively high, a recording mark RM is formed at the position of a focal point FM in the recording layer 101.

Incidentally, the recording layer 101 is obtained by mixing a predetermined photopolymerization initiator in a resin material for curing and, when the information light beam LM is focused in the recording layer 101, temperature abruptly rises centering around the focal point FM, which evaporates the photopolymerization initiator residue to generate air bubble around the focal point FM. The air bubble generated at this time remains without change as a cavity to serve as the recording mark RM.

In the recording layer 101, the refractive index largely differs between the cavity of the recording mark RM and resin material forming the recording layer 101, so that the reflectance of a light beam becomes comparatively higher in the recording mark RM.

Thus, in the case where the information light beam LM has strength for reproduction which is comparatively low, if the recording mark RM is formed at the position of the focal point FM in the recording layer 101, the information light beam LM is reflected to be the reflected information light beam LMR.

The optical disk apparatus 10 controls the position of the objective lens 18 relative to the optical disk 100 to thereby form the recording mark RM at various positions in the recording layer 101.

Concretely, the optical disk apparatus 10 sequentially forms a plurality of recording marks RM while forming a spiral-shaped track in the recording layer 101 of the optical disk 100. The recording marks RM thus formed are arranged in a plane which is substantially parallel to the disk surface of the optical disk 100 to thereby form a layer (hereinafter, referred to as "mark layer Y") of the recording marks RM.

The optical disk apparatus 10 changes the position of the focal point FM of the information light beam LM in the thickness direction of the optical disk 100 to form a plurality of mark layers Y in the recording layer 101. For example, the optical disk apparatus 10 sequentially forms the mark layers Y at a predetermined layer interval r starting from one surface 100A side of the optical disk 100.

Figure 6A:
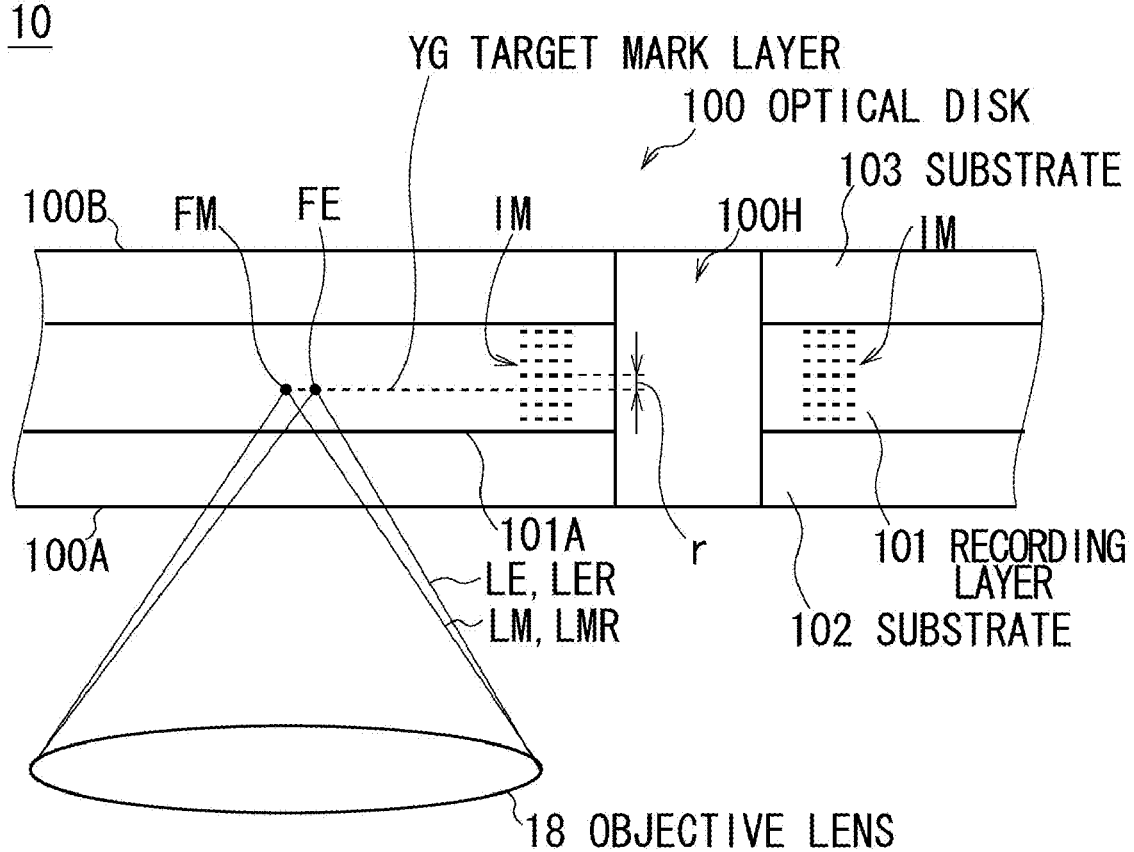
FIGS. 6A and 6B are schematic cross-sectional views to help explain focusing of a light beam in a first embodiment of the present invention.
Figure 6B:
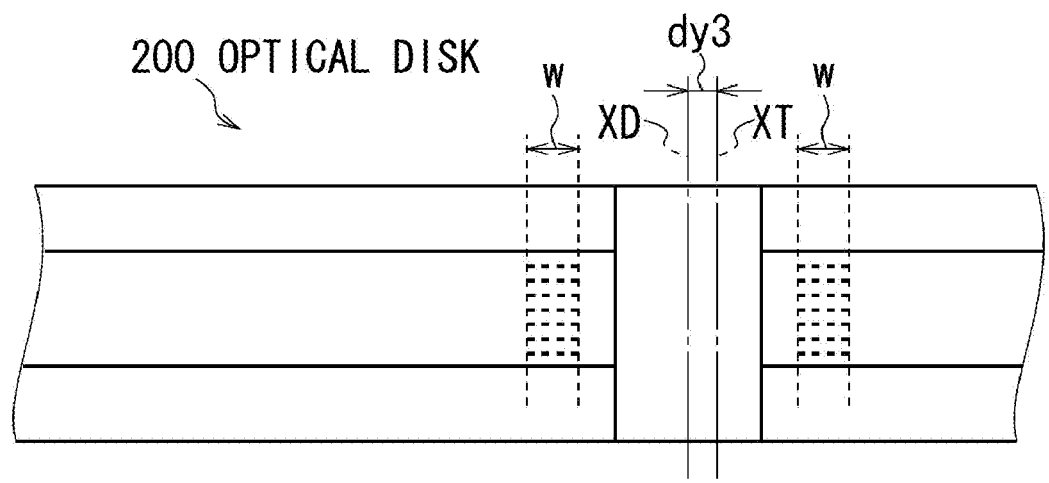
Figure 7:
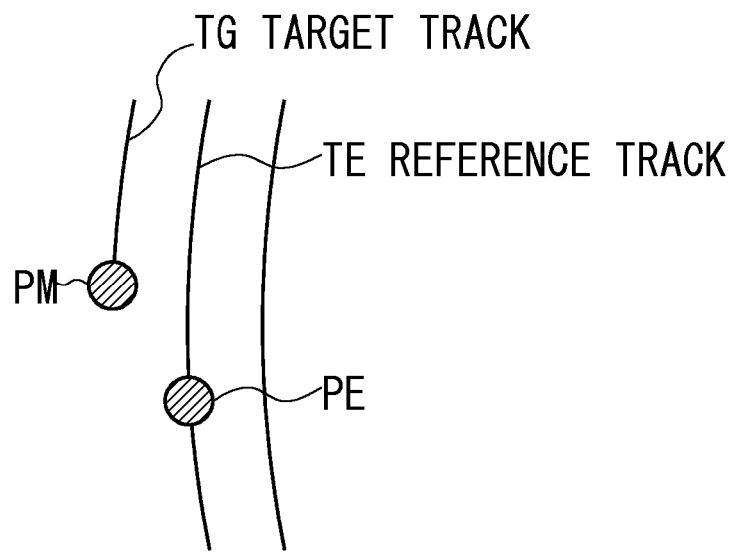
FIG. 7 is a schematic view showing a state where a light beam is irradiated onto a target mark layer in the first embodiment.

In addition, as shown in FIGS. 6 and 7, the optical disk apparatus 10 condenses, using the objective lens 18, a reference light beam LE which is different from the information light beam LM onto a track (hereinafter, referred to as "reference track TE") formed at a position away from a target position PG in the inner peripheral direction by one track width in the mark layer Y (hereinafter, referred to as "target mark layer YG") including the target position PG.

Incidentally, the optical disk apparatus 10 sequentially records the recording marks RM in a spiral manner starting from the inner peripheral side of the optical disk 100. Thus, at the time when the optical disk apparatus 10 records information on the target track TG while forming a new recording mark RM, a track has necessarily been formed at a position away from the target position PG in the inner peripheral direction by one track width. Therefore, the optical disk apparatus 10 uses the track formed at a position away from the target position PG in the inner peripheral direction by one track width as the reference track TE.

The reference light beam LE is reflected by the recording mark RM constituting the reference track TE to be a reflected reference light beam LER. The optical disk apparatus 10 detects the reflected reference light beam LER and performs position control of the objective lens 18 based on the detection result such that the reference light beam LE is focused onto the reference track TE.

Concretely, the optical disk apparatus 10 can perform the position control of the objective lens 18 according to the astigmatic method and push-pull method. In the astigmatic method, the optical apparatus 10 drives the objective lens 18 in the focusing direction which the direction in which the objective lens 18 is moved closer to/farther from the optical disk 100. In the push-pull method, the optical disk apparatus 10 drives the objective lens 18 in the tracking direction which is the radius direction of the optical disk 100.

The optical disk apparatus 10 appropriately adjusts the optical paths or divergence angles of the reference light beam LE and information light beam LM entering the objective lens 18 and condenses the reference light beam LE using the objective lens 18. At this time, the optical disk apparatus 10 allows the focal point FE of the reference light beam LE to be positioned at a position away from the focal point FM of the information light beam LM in the inner peripheral direction by one track width.

That is, as shown in FIG. 7, in the target mark layer YG of the optical disk 100, a beam spot PM of the information light beam LM is formed on the target track TG, and a beam spot PE of the reference light beam LE is formed on the reference track TE.

Thus, the optical disk apparatus 10 performs position control of the objective lens 18 such that the reference light beam LE is focused onto the reference track TE that has already been formed to thereby focus the information light beam LM onto the target position PG on the target track TG formed at a position away from the reference track TE in the outer peripheral direction by one track width.

The optical disk apparatus 10 can set the interval between the reference track TE and target track TG to just one track width. Thus, it is possible to significantly reduce a risk that information is erroneously overwritten on the existing track. Therefore, even if inclination or warpage has occurred in the optical disk 100, it is possible to record a new track while maintaining the interval between tracks constant.

As described above, the optical disk apparatus 10 performs position control of the objective lens 18 such that the reference light beam LE is focused onto the reference track TE that has already been formed in the recording layer 101 of the optical disk 100, to thereby focus the information light beam LM onto the target position PG on the target track TG.

(1-2) Configuration of Lead-In Mark

In the optical disk 100, lead-in marks IM are previously formed on a portion (hereinafter, referred to as "lead-in area") on the inner peripheral side in each mark layer Y formed in the recording layer 101, as shown in FIG. 6.

The lead-in marks IM are formed across several tracks starting from the inner peripheral side of the optical disk 10. When recording the recording mark RM for the first time in a portion (hereinafter, referred to as "data area") of each mark layer Y at which information is recorded, the optical disk apparatus 10 records the recording mark RM continuously from the end portion of the lead-in mark IM.

In practice, the lead-in marks IM of each mark layer Y are formed with the interval between the mark layers set to the layer interval r with high accuracy by using a dedicated recording apparatus before shipping.

Thus, when recording information in the optical disk 100, the optical disk apparatus 10 uses the lead-in marks IM as the reference track TE to form the recording mark RM continuously from the end portion of the lead-in mark IM, thereby adequately determining the starting position of the data area in each mark layer Y and setting the interval between the mark layers to the layer interval r with high accuracy.

Figure 8:
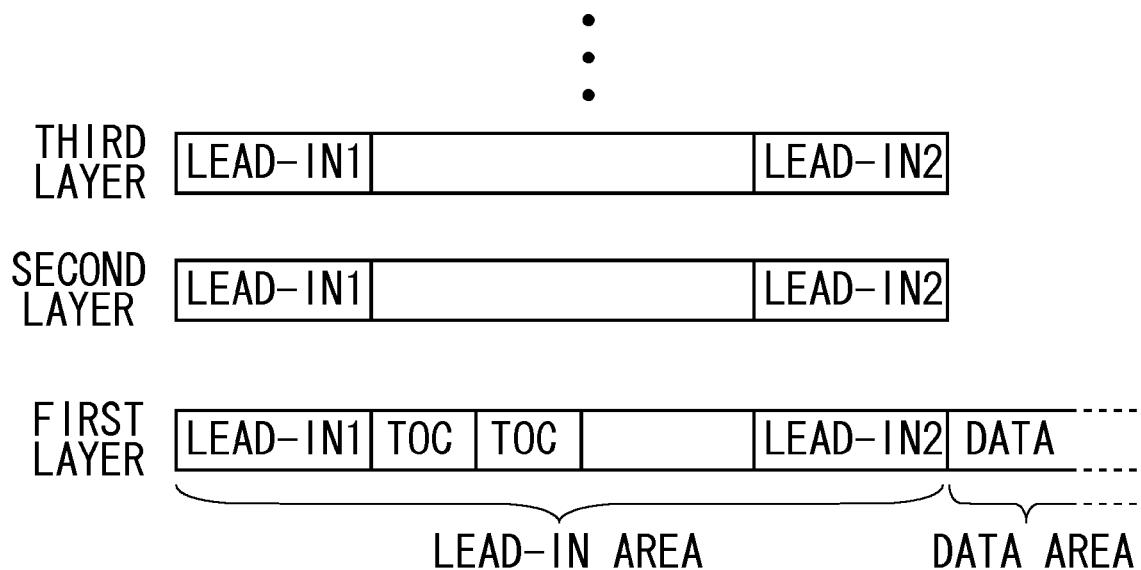
FIG. 8 is a schematic view showing a format of a lead-in area.

As shown in FIG. 8, which shows a format of the lead-in area, information such as Table Of Contents (TOC) is stored in the lead-in area. In the TOC, address information of data recorded in each mark layer Y, end address information for identifying the location where information is actually recorded, or address from which recording of information is started next time.

In practice, in the optical disk 100, information is sequentially recorded in units of the mark layer Y and, the TOC is added to the lead-in every time a series of recording is completed. In such a case, the TOC most recently recorded is treated as effective one.

In the optical disk 100, lead-in 1 is used as an introduction portion for recording the TOC for the first time, and lead-in 2 is used as an introduction portion for recording data in the data area for the first time.

The optical disk 100 sequentially records data starting from the first mark layer Y1 locating on the nearest side to the surface 100A in the recording layer 101. Thus, in the lead-in area corresponding to the first mark layer Y1 in the optical disk 100, the mark layer number, address information, and the like indicating the recording starting point referred to at the time of adding data onto the optical disk 100 are stored in the TOC.

Figure 3A:
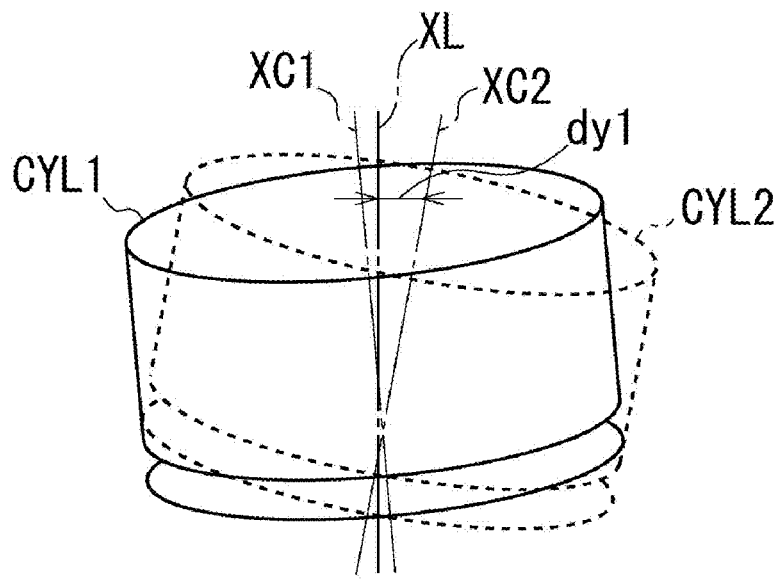
FIGS. 3A to 3C are schematic views to help explain displacement (1) of a recording position.

In the case where the optical disk 100 is warped or inclined, a displacement corresponding to, e.g., a distance dy1 may occur between an ideal target position and actual focal point FM of the information light beam LM as shown in FIG. 3A. The same displacement is considered to occur in the case where the optical axis XL of the reference light beam LE is inclined relative to the central axis XC of the virtual cylinder CYL.

Figure 3B:
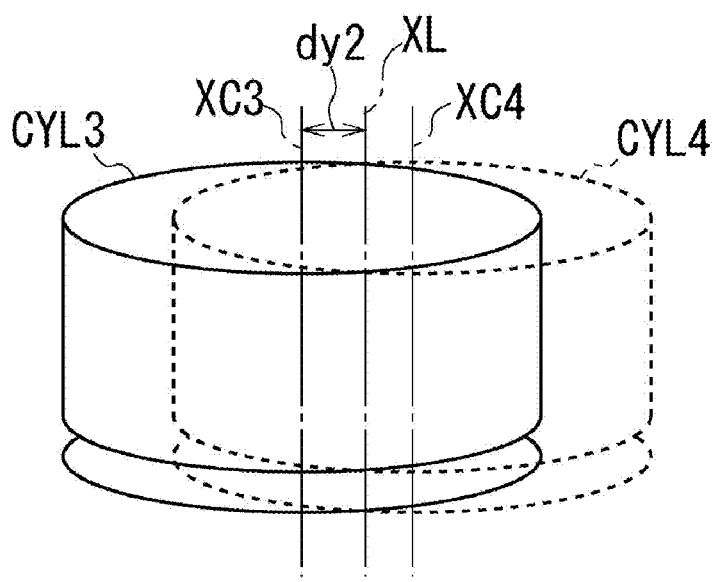

Further, in the case where the optical axis XL of the reference light beam LE does not coincide with the central axis XC of the virtual cylinder CYL, a displacement corresponding to a distance dy2 may occur between the optical axis XL and optical axis XC as shown in FIG. 3B.

Further, there is a possibility that a displacement corresponding to a distance dy3 may occur between the rotational central axis XT of a spindle motor 15 (to be described later) for driving the optical disk 100 and central axis XD of the optical disk 100.

In order to cope with the above situation, a condition of a width W of the lead-in area in the tracking direction is defined by the following expression (1), assuming that the maximum distances dy1, dy2, and dy3 that can be assumed in consideration of the assembly accuracy of the optical disk apparatus 10:

$$W > dy1\text{max} + dy2\text{max} + dy3\text{max} \tag{1}$$

As a result, the optical disk apparatus 10 can prevent the information light beam LM from falling outside the width W of the lead-in area when focusing the reference light beam LE onto the lead-in area, thereby eliminating a risk that the information light beam LM cannot be focused onto the lead-in mark IM.

(1-3) Configuration of Optical Disk Apparatus

Concrete configurations of the optical disk apparatus 10 and an optical pickup 17 will be described.

Figure 9:
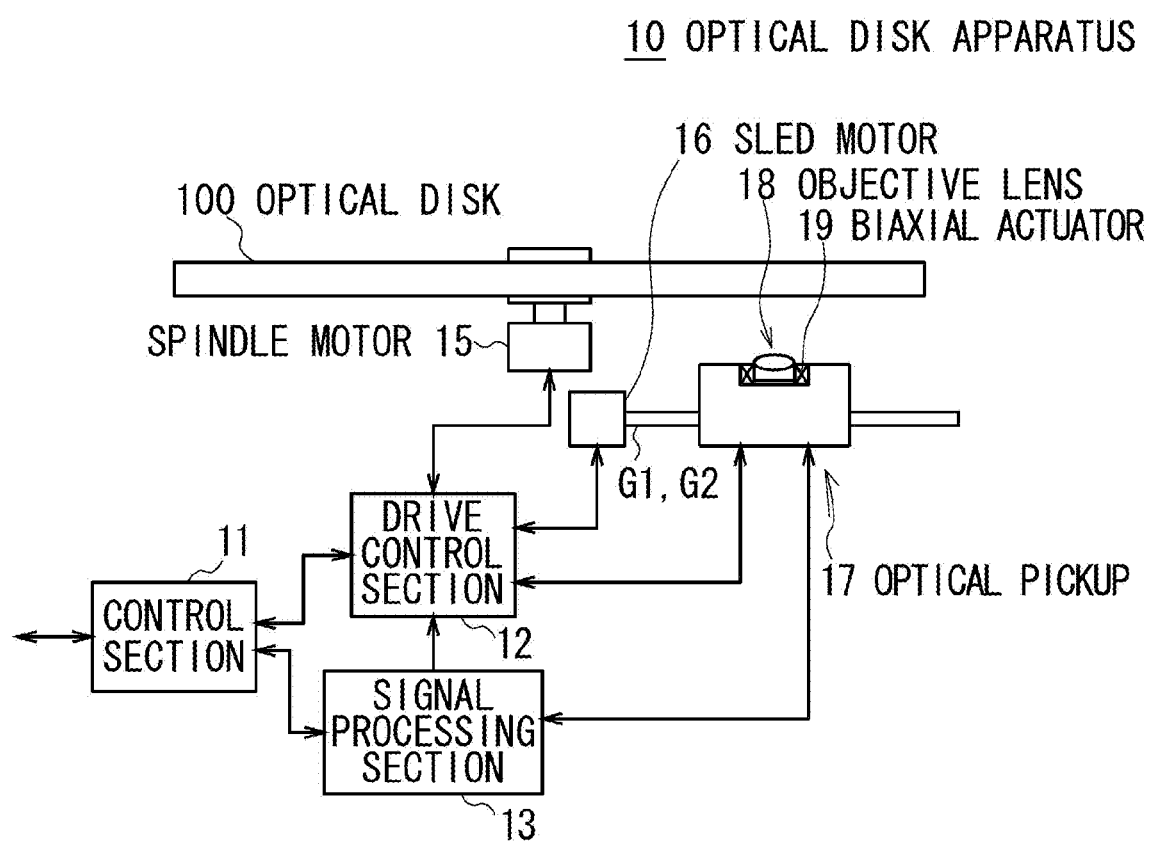
FIG. 9 is a schematic view showing the entire configuration of an optical disk apparatus according to the first embodiment.

As shown in FIG. 9, the optical disk apparatus 10 is mainly constituted by a control section 11. The control section 11 includes a not shown central processing unit (CPU), a read only memory (ROM) storing various programs, etc., and a random access memory (RAM) used as the work memory for the CPU.

When recording information in the optical disk 100, the control section 11 drives/rotates a spindle motor 15 through a drive control section 12 to thereby rotate the optical disk 100 placed on a turntable (not shown) at a desired speed.

Further, the control section 11 drives a sled motor 16 through the drive control section 12 to thereby move the optical pickup 17 in the tracking direction, i.e., in the direction toward the inner peripheral side or outer peripheral side of the optical disk 100 along its moving shafts G1 and G2.

The optical pickup 17 has a plurality of optical components including the objective lens 18 attached thereto and irradiates the information light beam LM and reference light beam LE onto the optical disk 100 under the control of the control section 11 to thereby detect the reflected servo light beam LER which is the reflected light of the reference light beam LE.

The optical pickup 17 generates a plurality of detection signals based on the detection result of the reflected servo light beam LER and supplies the generated signals to a signal processing section 13. The signal processing section 13 performs predetermined calculation processing using the supplied detection signals to generate a focus error signal SFE and a tracking error signal STE and supplies the generated signals to the drive control section 12.

The drive control section 12 generates a drive signal for driving the objective lens 18 based on the supplied focus error signal and tracking error signal and supplies the generated drive signal to a biaxial actuator 19 of the optical pickup 17.

The biaxial actuator 19 of the optical pickup 17 performs focus control and tracking control of the objective lens 18 based on the drive signal to thereby allow the focal point FE of the reference light beam LE condensed by the objective lens 18 to follow the reference track TE of the target mark layer YG.

At this time, the control section 11 modulates the intensity of the information light beam LM based on information supplied from an external device using the signal processing section 13 to form the recording mark RM on the target track TG of the target mark layer YG, thereby recording the information.

When reproducing information from the optical disk 100, the optical pickup 17 allows the focal point FE of the reference light beam LE to follow the reference track TE of the target mark layer YG as in the recording time and irradiates the target track TG of the target mark layer YG with the information light beam LM having a comparatively low constant strength to detect the reflected information light beam LMR which is the reflected light of the information light beam LM reflected at the portion where the recording mark RM is formed.

The optical pickup 17 generates a detection signal based on the detection result of the reflected information light beam LMR and supplies the generated detection signal to the signal processing section 13. The signal processing section 13 performs predetermined calculation processing, demodulation processing, decoding processing, and the like for the detection signal to thereby reproduce information recorded, as the recording mark RM, in the target track TG of the target mark layer YG.

(1-4) Configuration of Optical Pickup

Figure 10:
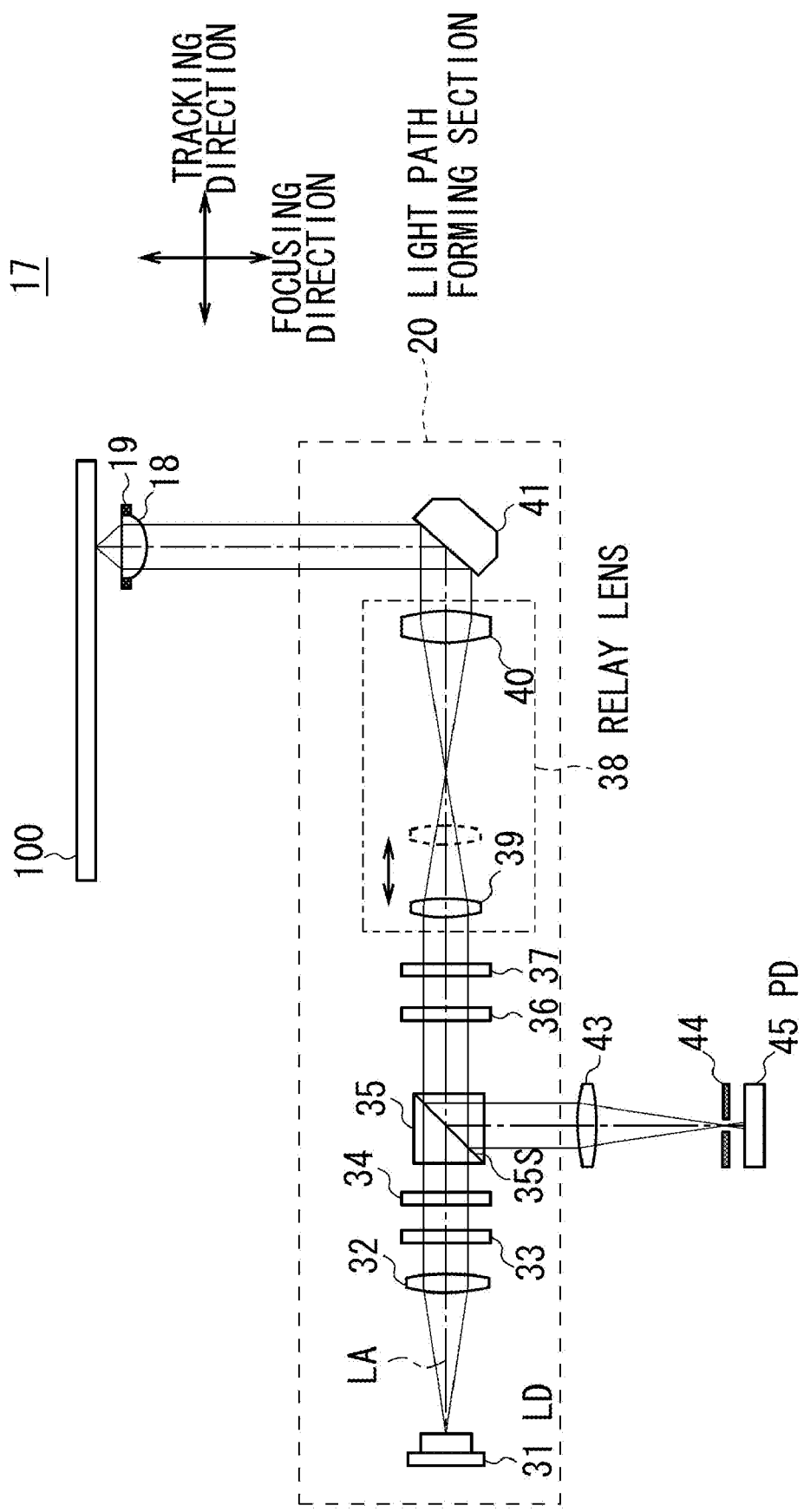
FIG. 10 is a schematic view showing a configuration of an optical pickup according to the first embodiment.

A configuration of the optical pickup 17 will next be described. As shown in FIG. 10, the optical pickup 17 is constituted by a combination of a large number of optical components and forms the optical paths of the information light beam LM and reference light beam LE by an optical path forming section 20.

The optical path forming section 20 uses a hologram to split a light beam LA emitted from a laser diode 31 into the reference light beam LE and information light beam LM and allows them to enter the objective lens 18 while adjusting the optical axes or divergence angles thereof.

More specifically, the laser diode 31 emits the light beam LA which is a blue laser light having a wavelength of about 405 nm toward a collimator lens 32. In practice, the laser diode 31 emits the light beam LA of a predetermined amount in the form of a diverging light under the control of the control section 11 (FIG. 9). Then, the collimator lens 32 converts the light beam LA from the diverging light into a parallel light and allows the parallel light to enter a ½ wavelength plate 33.

The polarization direction of the light beam LA is rotated by a predetermined angle by the ½ wavelength plate to allow the light beam LA to be, e.g., a light beam of P-polarization, which enters a grating 34.

The grating 34 diffracts the light beam LA to split it into the information light beam LM which is a zero-order diffracted light and reference light beam LE which is a first order diffracted light and allows them to enter a polarization beam splitter 35.

Although the information light beam LM and reference light beam LE travel with their optical axes slightly away from each other, they travel along substantially the same optical path. Thus, in FIG. 10 and the like, only the optical path of the information light beam LM is shown and the optical path of the reference light beam LE is omitted for convenience of the explanation.

The polarization beam splitter 35 has a reflecting/transmitting surface 35S that reflects or transmits the light beam in different ratios depending on the polarization direction of the incident light beam. For example, the reflecting/transmitting surface 35S almost entirely transmits a P-polarized light beam and almost entirely reflects an S-polarized light beam.

In practice, the polarization beam splitter 35 transmits the information light beam LM and reference light beam LE to allow them to enter a liquid crystal panel 36.

The liquid crystal panel 36 corrects the spherical aberration of the information light beam LM and reference light beam LE and allows the resultant information light beam LM and reference light beam LE to enter a ¼ wavelength plate 37. The ¼ wavelength plate 37 converts the information light beam LM and reference light beam LE from a P-polarized light into, e.g., a right-handed circularly polarized light and allows it to enter a relay lens 38.

The relay lens 38 uses a movable lens 39 to convert the information light beam LM and reference light beam LE from the parallel lights into converging lights, uses a fixed lens 40 to convert the information light beam LM and reference light beam LE which have become diverging lights after being converged into converging lights once again, and allows the converging lights to enter a mirror 41.

The movable lens 39 can be moved in the optical axis direction of the information light beam LM by a not shown actuator. In practice, the relay lens 38 uses the actuator to move the movable lens 39 under the control of the control section 11 (FIG. 9) to thereby change the converging state of the information light beam LM and reference light beam LE emitted from the fixed lens 40.

The mirror 41 reflects the information light beam LM and reference light beam LE and, at the same time, reverses the polarization direction of the circularly polarized information light beam LM and reference light beam LE, to thereby allow them to enter the objective lens 18.

The objective lens 18 condenses the information light beam LM and reference light beam LE. The distances between the objective lens 18 and focal point FM of the information light beam LM and between the objective lens 18 and focal point FE of the reference light beam LE in the focusing direction are determined depending on the divergence angles of the reference light beam LE and information light beam LM emitted from the relay lens 38.

Incidentally, the optical pickup 17 is designed to focus the focal point FM of the information light beam LM and focal point FE of the reference light beam LE onto a boundary surface 101A of the optical disk 100 between the recording layer 101 and substrate 102 in a state where the movable lens 39 is set at a predetermined reference position and makes the movement distance of the movable lens 39 and movement distances of the focal point FM of the information light beam LM and focal point FE of the reference light beam LE proportional to each other.

In practice, the relay lens 38 moves the movable lens 39 under the control of the control section 11 to substantially focus the focal points FM and FE onto the target mark layer YG in the recording layer.

The objective lens 18 condenses the reference light beam LE onto near the existing reference track TE. At this time, as shown in FIG. 6, the reference light beam LE is reflected by the recording mark RM formed on the reference track TE to be a reflected reference light beam LER.

The reflected reference light beam LER travels along the optical path of the reference light beam LE in the opposite direction. That is, the divergence angle of the reflected reference light beam LER is converted by the objective lens 18. Then, the reflected reference light beam LER is reflected by the mirror 41, converted into a parallel light by the relay lens 38, transmitted through the ¼ wavelength plate 37 and liquid crystal panel 36, and finally enters the polarization beam splitter 35 as an S-linear polarized light.

The polarization beam splitter 35 reflects the S-polarized reflected reference light beam LER at its reflecting/transmitting surface 35S to allow the reflected reference light beam LER to enter a condensing lens 43. The condensing lens 43 condenses the reflected reference light beam LER and allows the reflected reference light beam LER to enter a photodetector 45 through a pinhole plate 44.

Figure 11:
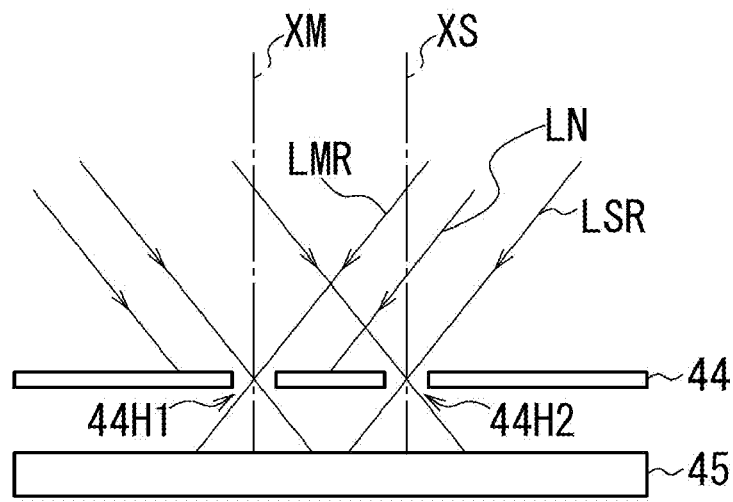
FIG. 11 is a schematic cross-sectional view to help explain selection of a light beam which is made using pinholes.

As shown in FIG. 11, the pinhole plate 44 is so arranged as to position the focal point of the reflected reference light LER condensed by the condensing lens 43 (FIG. 10) in a hole portion 44H2, so that the reflected reference light beam LER is transmitted through the pinhole plate 44.

On the other hand, the pinhole plate 44 does not transmit most of a light (hereinafter, referred to as "stray light LN") having a focal point different from that of the reflected reference light LER, which is like one reflected at the surface of the substrate 102 of the optical disk 100 or recording mark RM existing in the mark layer Y which is not the target position PG.

Figure 12:
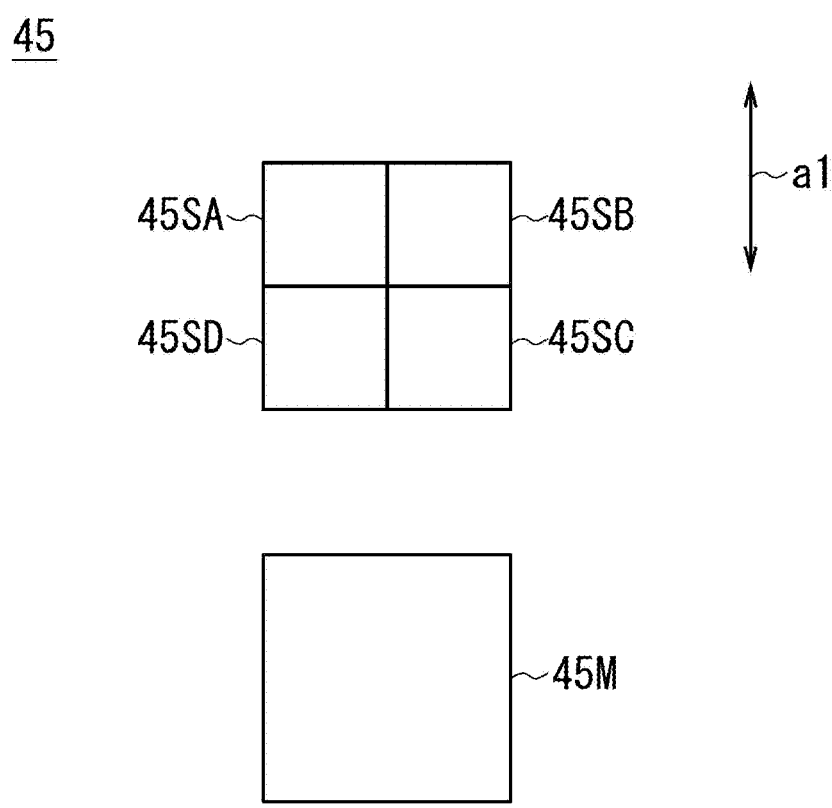
FIG. 12 is a schematic view showing a configuration of a detection area in a photodetector.

The photodetector 45 has detection areas 45SA, 45SB, 45SC, and 45SD for receiving the reflected reference light beam LER, as shown in FIG. 12.

The entire detection area is divided into two sections, respectively, in arrow a1 direction corresponding to the running direction of the track at the time when the reference mark LE is irradiated onto the target mark layer YG (FIG. 6) and in the orthogonal direction to the arrow a1 direction to obtain the respective areas 45SA to 45SD.

The photodetector 45 detects parts of the reflected reference light beam LER, respectively, at the detection areas 45SA to 45SD, generates detection signals U1A, U1B, U1C, and U1D in accordance with the detected light amount, and transmits the detection signals to the signal processing section 13 (FIG. 9).

The signal processing section 13 performs focus control according to the astigmatic method to calculate a focus error signal SFE1 according to the following expression (2) and supplies the focus error signal SFE1 to the drive control section 12:

$$SFE1 = (U1A + U1C) - (U1B + U1D) \quad (2)$$

The focus error signal SFE1 represents the amount of misalignment between the focal point FE of the reference light beam LE and reference track TE (i.e., target mark layer YG) in the focusing direction.

Further, the signal processing section 13 performs tracking control according to the push-pull method to calculate a tracking error signal STE1 according to the following expression (3) and supplies the tracking error signal STE1 to the drive control section 12:

$$STE1 = (U1A + U1D) - (U1B + U1C) \quad (3)$$

The tracking error signal STE1 represents the amount of displacement between the focal point FE of the reference light beam LE and reference track TE in the tracking direction.

Further, the signal processing section 13 generates a reproduction RF signal SRFE of the reference track TE according to the following expression (4):

$$SRFS = U1A + U1B + U1C + U1D \quad (4)$$

The signal processing section 13 performs predetermined demodulation processing, decoding processing, and the like for the reproduction RF signal SRFE of the reference track TE to thereby read out address information recorded together with information and supplies the address information to the drive control section 12 as reference track address information AS.

The drive control section 12 generates a focus drive signal SFD1 based on the focus error signal SFE1 and supplies the focus drive signal SFD1 to the biaxial actuator 19 to thereby perform focus control of the objective lens 18 such that the reference light beam LE is focused onto the reference track TE (i.e., the target mark layer YG).

Further, the drive control section 12 generates a tracking drive signal STD1 based on the tracking error signal STE1 and supplies the tracking drive signal STD1 to the biaxial actuator 19 to thereby perform tracking control of the objective lens 18 such that the reference light beam LE is focused onto the reference track TE.

Further, the drive control section 12 determines, based on the reference track address information AS, whether the track onto which the reference light beam LE is currently focused is a correct reference track TE, i.e., a track formed at a position away from the target track TG in the inner peripheral direction by one track width. In the case where the track onto which the reference light beam LE is currently focused is not a correct reference track TE, the drive control section 12 performs position control of the objective lens 18 on a track basis so as to focus the reference light beam LE onto the correct reference track TE.

Then, the optical pickup 17 performs focus control and tracking control of the objective lens 18 using the reference light beam LE to focus the reference light beam LE onto the reference track TE of the target mark layer YG.

On the other hand, the information light beam LM enters the objective lens 18 through the optical path forming section 20, allowing the focal point FM of the information light beam LM to be positioned at a position away from the focal point FE of the reference light beam LE in the outer peripheral direction by just one track width, as described above.

That is, the focal point FM of the information light beam LM is focused onto a position away from the reference track TE of the target mark layer YG in the outer peripheral direction by just one track width. At this time, the beam spots PE and PM as shown in FIG. 7 are formed on the target mark layer YG.

Thus, when recording information in the optical disk 100, the optical pickup 17 can record the recording mark RM as a new track while maintaining a constant interval from the existing track with high accuracy.

In practice, the signal processing section 13 performs coding processing, modulation processing, and the like for the information to be recorded to generate binary recording data consisting of "0"s and "1"s. Further, the signal processing section 13 performs emission control of the information light beam LM (i.e., light beam LA) such that the recording mark RM is formed for, e.g., the code "1" of the recording data while the recording mark RM is not formed for, the code "0".

When the information is reproduced from the optical disk 100, if the recording mark RM is formed at the target position PG of the target track TG, the information light beam LM is reflected by the recording mark RM to be the reflected information light beam LMR.

The reflected information light beam LMR travels along substantially the same optical path as the reflected reference light beam LER, condensed by the condensing lens 43 (FIG. 10), and reaches the photodetector 45 through the hole portion 44H1 (FIG. 11) of the pinhole plate 44.

The photodetector 45 detects the reflected information light beam LMR at its detection area 45M, generates the detection signal U2 in accordance with the detected light amount, and transmits the detection signal U2 to the signal processing section 13 (FIG. 9).

The signal processing section 13 detects, based on the detection signal U2, whether the recording mark RM has been formed by detecting the value of "1" (formed) or "0" (not formed) of the detection signal U2 to thereby generate the reproduction RF signal. The signal processing section 13 then performs predetermined demodulation processing, decoding processing, and the like for the reproduction RF signal to thereby reproduce recorded information.

As described above, the optical pickup 17 performs focus control and tracking control of the objective lens 18 using the reference light beam LE to focus the reference light beam LE onto the reference track TE of the target mark layer YG, thereby focusing the information light beam LM onto the target track TG formed at a position away from the reference track TE in the target mark layer YG in the outer peripheral direction by one track width.

(1-5) Information Recording Processing

As described above, the optical disk apparatus 10 performs address management for each mark layer Y by utilizing the TOC stored in the lead-in area (FIG. 8) of the optical disk 100.

That is, when recording information in the optical disk 100, the optical disk apparatus 10 refers to information such as the TOC recorded in the lead-in area to recognize the address from which recording is to be started.

The optical disk apparatus 10 adds a new TOC to the lead-in area after recording data in the data area (FIG. 8) of the optical disk 100.

Figure 13:
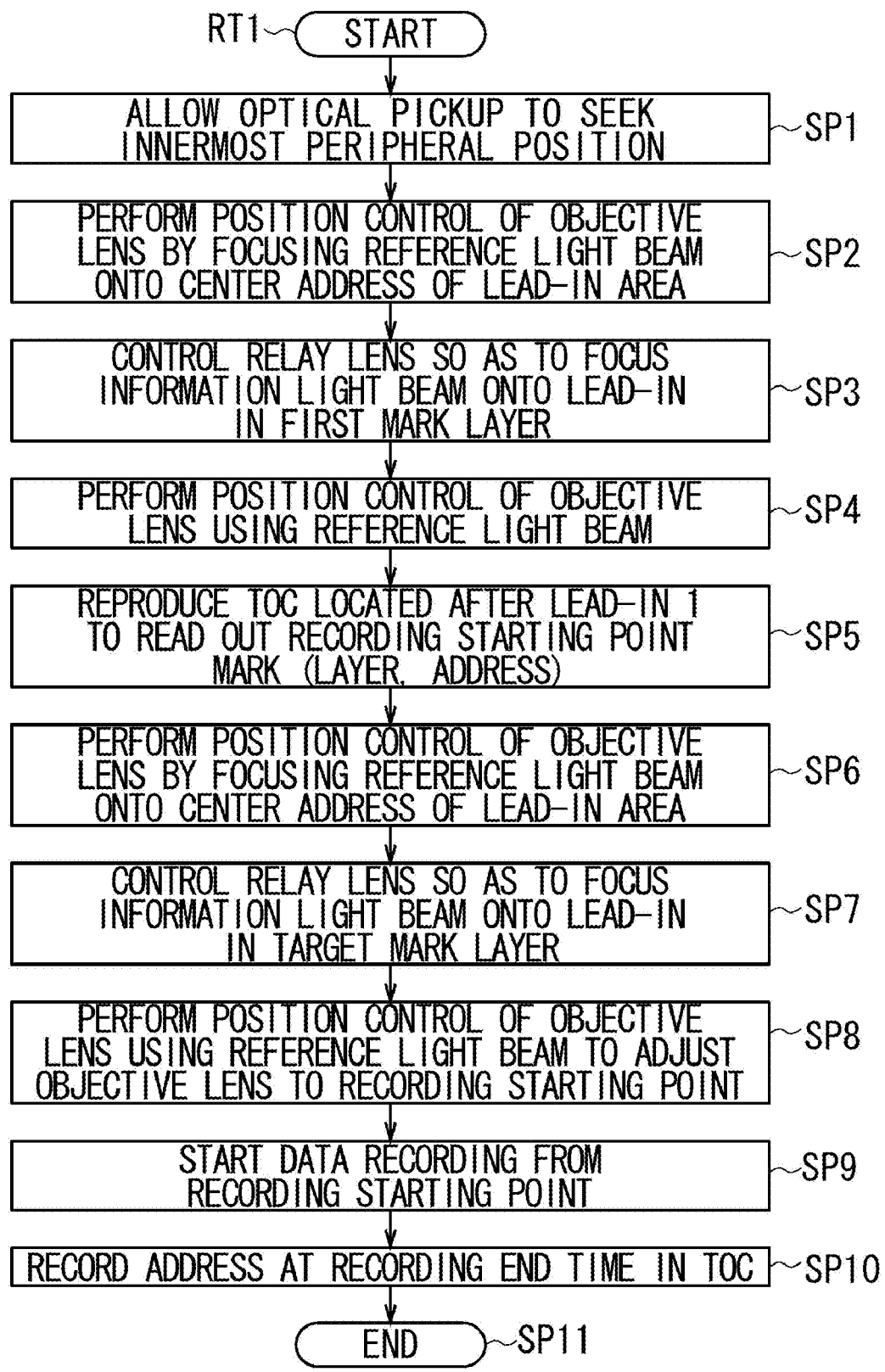
FIG. 13 is a flowchart showing an information recording processing procedure.

Here, information recording processing in which the optical disk apparatus 10 records information while referring to the TOC will be described using the flowchart of FIG. 13.

When acquiring a recording instruction of recording information in the optical disk 100 from a not shown external device or the like, the control section 11 of the optical disk apparatus 10 starts information recording processing procedure RT1 and then proceeds to step SP1.

In step SP1, the control section 11 drives the sled motor 16 through the drive control section 12 to move the optical pickup 17 to the innermost peripheral side of the optical disk 100 and then proceeds to step SP2.

In step SP2, the control section 11 performs position control of the objective lens 18 in the focusing and tracking directions based on the reference light beam LE to focus the reference light beam LE onto the center address of the lead-in area and then proceeds to step SP3.

In step SP3, the control section 11 sets a first mark layer Y1 as the target mark layer YG, controls the relay lens 38 so as to focus the information light beam LM onto the lead-in mark IM in the target mark layer YG, and then proceeds to step SP4.

With the above operation, the control section 11 can perform feedback control of the position of the movable lens 39 of the relay lens 38 by utilizing the lead-in mark IM of the first mark layer Y1.

In step SP4, the control section 11 performs position control of the objective lens 18 so as to focus the reference light beam LE onto the reference track TE of the target mark layer YG and then proceeds to step SP5.

In step SP5, the control section 11 reproduces the TOC recorded at a location after the first lead-in (FIG. 8) to thereby read out the mark layer number, address information, and the like of the recording starting point from which data recording is to be started and then proceeds to step SP6.

In step SP6, as in the case of step SP2, the control section 11 performs position control of the objective lens 18 based on the reference light beam LE to focus the reference light beam LE onto the center address of the lead-in area and then proceeds to step SP7.

In step SP7, the control section 11 sets a mark layer Y including the recording starting point as the target mark layer YG, controls the relay lens 38 so as to focus the information light beam LM onto the lead-in mark IM in the target mark layer YG, and then proceeds to step SP8.

With the above operation, the control section 11 can perform feedback control of the position of the movable lens 39 of the relay lens 38 by utilizing the lead-in mark IM of the target mark layer YG including the recording starting point.

In step SP8, the control section 11 performs position control of the objective lens 18 so as to focus the reference light beam LE onto the reference track TE formed at a position away from the recording starting point of the target mark layer YG in the inner peripheral direction by one track width and then proceeds to step SP9.

At this time, the control section 11 focuses the reference light beam LE onto the reference track TE, thereby focusing the information light beam LM onto a track (i.e., target track TG) formed at a position away from the reference track TE in the outer peripheral direction by one track width.

In step SP9, the control section 11 starts data recording from the recording starting point and sequentially records the data while forming tracks in succession. After the data recording is completed, the control section 11 proceeds to step SP10.

In step SP10, the control section 11 determines, based on the address at which the data recording is ended, the mark layer Y including the recording starting point from which the next data recording is started and its address, and adds, as the latest TOC, its mark layer number and address information to the lead-in area in the first mark layer Y1. After that, the control section 11 proceeds to step SP11 where it ends a series of the information recording processing procedure.

(1-6) Operation and Effect

With the above configuration, the optical pickup 17 of the optical disk apparatus 10 diffracts, using the grating 34 of the optical path forming section 20, the light beam LA to split it into the information light beam LM which is a zero-order diffracted light and reference light beam LE which is a first order diffracted light and allows them to enter the objective lens 18.

The optical disk apparatus 10 performs position control of the objective lens 18 in the focusing and tracking direction so as to focus the reference light beam LE onto the reference track TE in the target mark layer YG of the optical disk 100.

At this time, according to the optical design and the like of the optical path forming section 20 in the optical pickup 17, the optical disk apparatus 10 positions the focal point FM of the information light beam LM condensed by the objective lens 18 at a position away from the focal point FE of the reference light beam LE in the outer peripheral direction by just one track width in the tracking direction.

Therefore, the optical disk apparatus 10 can focus the focal point FM of the information light beam LM onto a position away from the reference track TE of the target mark layer YG in the outer peripheral direction by just one track width by performing position control of the objective lens 18 so as to focus the reference light beam LE onto the reference track TE in the target mark layer YG.

That is, it is possible to focus the information light beam LM onto the target mark layer YG simply by focusing the reference light beam LE onto the reference track TE in the target mark layer YG.

Further, the optical disk apparatus 10 can fix the interval between the focal point FE and focal point FM in the tracking direction to a distance corresponding to just one track width according to the optical design and the like of the optical path forming section 20 in the optical pickup 17.

Thus, as compared with the case where the reference layer 104 is provided in the optical disk 100 as shown in FIG. 1B and position control of the objective lens is performed so as to focus another light beam to the servo layer, it is possible to maintain, with higher accuracy, the interval between the existing track and a new track constant especially when a new recording mark RM is recorded continuously from the existing track.

That is, even if the optical disk 100 is inclined or warped and therefore the optical axis of the information light beam LM cannot vertically enter the recording layer 101 as in the case shown in FIG. 2A, the optical disk apparatus 10 can focus the information light beam LM onto the target track TG by focusing the reference light beam LE onto the reference track TE.

Figure 3C:
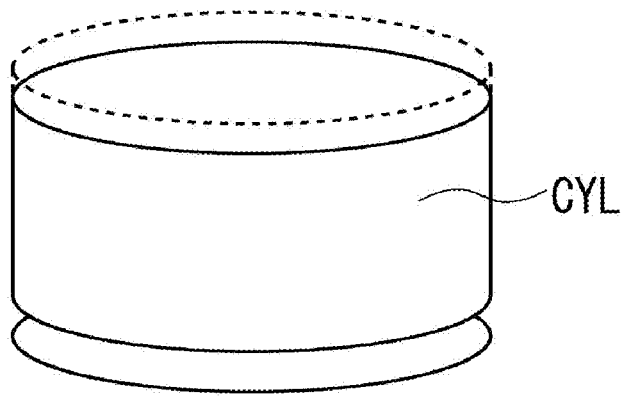
Figure 4:
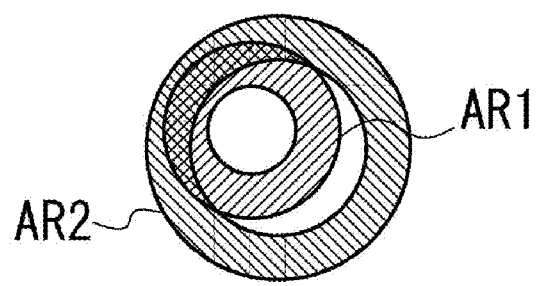
FIG. 4 is a schematic view to help explain displacement (2) of a recording position.

Further, even in the case where the optical disk 100 contracts to cause the distance between the boundary surface 101A and respective mark layers Y change as shown in FIG. 3C, the optical disk apparatus 10 can record/reproduce the recording mark RM while maintaining continuity with the existing track by focusing the reference light beam LE onto the reference track TE.

Further, when forming the first recording mark RM in each mark layer Y, the optical disk apparatus 10 can set the lead-in mark IM that has previously formed in the optical disk 100 as the reference track TE. Therefore, it is possible to set the interval between the mark layers Y to the ideal interval r by using the lead-in mark IM formed with high accuracy as a reference.

At this time, the optical disk apparatus 10 can fine adjust the position of the movable lens 39 in the relay lens 38 through feedback control by utilizing the lead-in mark IM. As a result, the optical disk apparatus 10 can bring the interval between the mark layers Y much closer to the ideal interval r as compared with the case where the position of the movable lens 39 is set in a simple manner.

With the above configuration, in the optical disk apparatus 10, the optical path forming section 20 of the optical pickup 17 adjusts the optical paths of the reference light beam LE and information light beam LM, and then the objective lens 18 condenses the reference light beam LE and information light beam LM. Further, the optical pickup 17 performs position control of the objective lens 18 in the focusing and tracking directions so as to focus the reference light beam LE onto the reference track TE in the target mark layer YG to thereby focus the focal point FM of the information light beam LM condensed by the objective lens 18 onto the target track TG in the target mark layer YG.

(2) Second Embodiment (2-1) Basic Principle of Focus Position Control

Figure 14:
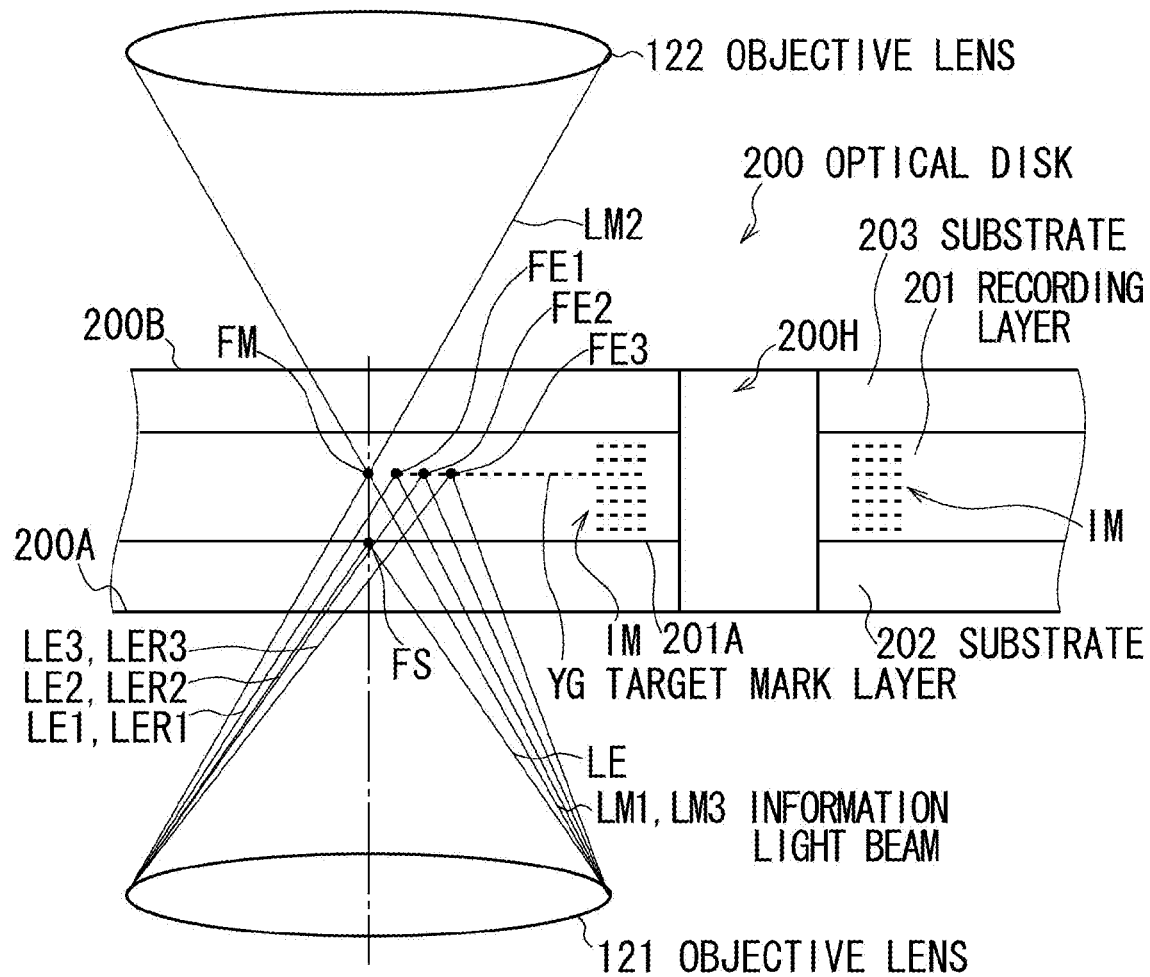
FIG. 14 is a schematic view to help explain focusing of a light beam in a second embodiment of the present invention.

The basic principle of focus position control according to a second embodiment will next be described. In the second embodiment, recording marks RM which are holograms are formed in the recording layer 201 of the optical disk 200 (corresponding to the recording layer 101 of the optical disk 100 in the first embodiment), as shown in FIG. 14 (corresponding to FIG. 6 of the first embodiment).

That is, when recording information in the optical disk 200, the optical disk apparatus 110 uses an objective lens 121 to condense an information light beam LM1 from the first surface 200A side and uses an objective lens 122 to condense an information light beam LM2 onto the same focal point FM1 as the information light beam LM1 from the other surface 200B side. In this case, the information light beam LM1 and information light beam LM2 are laser lights which are emitted from the same light source and are coherent with each other.

The recording layer 201 is formed using a photopolymer, in which monomers are uniformly dispersed. Therefore, when the recording layer 201 is irradiated with a light, the monomers are subjected to photopolymerization or photocrosslinking at the light irradiation portion with the result that the recording layer 201 is polymerized and, accordingly, the refractive index changes.

In practice, the refractive index of the portion at which the information light beams LM1 and LM2 interfere with each other and therefore the intensities thereof are increased is locally changed at the position of the focal point FM1 in the recording layer 201. As a result, the recording mark RM which is a hologram is formed at the portion corresponding to the focal point FM1.

When reproducing information from the optical disk 200, the optical disk apparatus 110 condenses the information light beam LM1 from, e.g., the first surface 200A side. In this case, in the case where the recording mark RM, i.e., a hologram has been formed at the portion corresponding to the focal point FM1, information light beam LM3 is emitted from the recording mark RM by the action of the hologram.

The optical disk apparatus 110 according to the second embodiment uses three reference light beams LE1, LE2, and LE3, in place of one reference light beam LE of the first embodiment, to perform tracking control according to the differential push-pull (DPP) method.

That is, the optical disk apparatus 110 according to the second embodiment uses the objective lens 121 to condense the three reference light beams LE1, LE2, and LE3 in addition to the information light beam LM1.

The reference light beams LE1, LE2, and LE3 are focused onto the target mark layer YG which is the same layer as the target track TG. Further, beam spots PE1, PE2, and PE3 of the reference light beams LE1, LE2, and LE3 are away from each other by a ½ track in the tracking direction.

Figure 15:
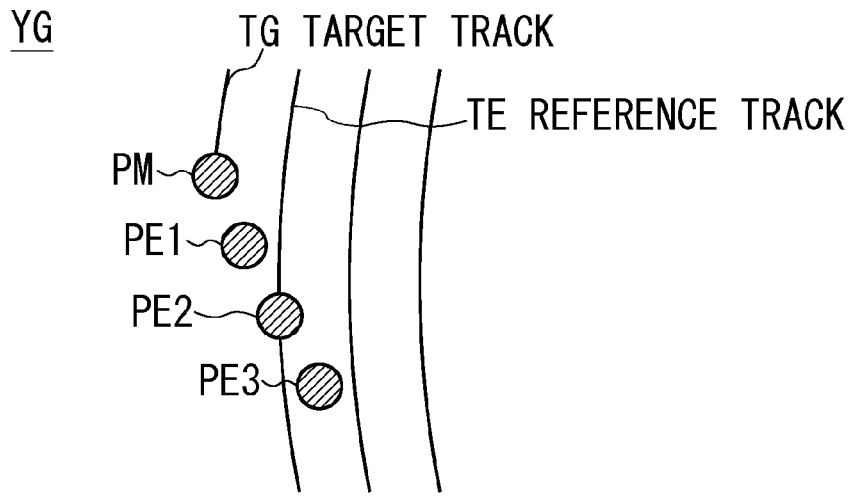
FIG. 15 is a schematic view showing a state where a light beam is irradiated onto a target mark layer in the second embodiment.

That is, in the target mark layer YG, the beam spot PE2 of the reference light beam LE2 is formed on the reference track TE formed at a position away from the target track TG in the inner peripheral direction by one track width, as shown in FIG. 15 (corresponding to FIG. 7 of the first embodiment). Further, the beam spots PE1 and PE3 of the reference light beams LE1 and LE3 are formed on ½-track outer peripheral side relative to the reference track TE and on ½-track inner peripheral side relative to the same.

A beam spot PM of the information light beam LM is formed on the target track TG formed at a position away from the reference track TE in the outer peripheral direction by one track width.

That is, in the second embodiment, the focal points PE1, PE2, and PE3 of the reference light beams LE1, LE2, and LE3 are formed on the reference track TE, on ½-track outer peripheral side relative to the reference track TE, and on ½-track inner peripheral side relative to the same as in the case of the DPP method which is a tracking method commonly used for an optical disk such as a CD or DVD.

The reference light beams LE1, LE2, and LE3 are reflected by the recording marks RM formed on the reference track TE in the target mark layer YG to be reflected reference light beams LER1, LER2, and LER3, respectively.

The optical disk apparatus 110 receives the reflected reference light beams LER1, LER2, and LER3 and performs, based on the reception result, position control of the objective lens 121 in the tracking direction according to the DPP method. With this operation, the optical disk apparatus 110 focuses the reference light beam LE onto the reference track TE formed at a position away from the target track TG in the inner peripheral direction by one track width.

Based on the reception result, the optical disk apparatus 110 also performs position control of the objective lens 121 in the focusing direction according to the astigmatic method employed in the first embodiment.

As described above, the optical disk apparatus 110 performs position control of the objective lens 121 in the focusing and tracking directions to thereby focus the reference light beam LE2 onto the reference track TE.

As described above, the optical disk apparatus 110 utilizing the positional relationship between the focal point FM1 of the information light beam LM1 and focal point FE2 of the reference light beam LE2 to focus the information light beam LM onto the target track TG formed at a position away from the reference track TE in the outer peripheral direction by one track width in the target layer YG.

The basic principal of the second embodiment other than the abovementioned point is the same as that of the first embodiment and the descriptions thereof are omitted here.

(2-2) Configurations of Optical Disk Apparatus and Optical Pickup

Figure 16:
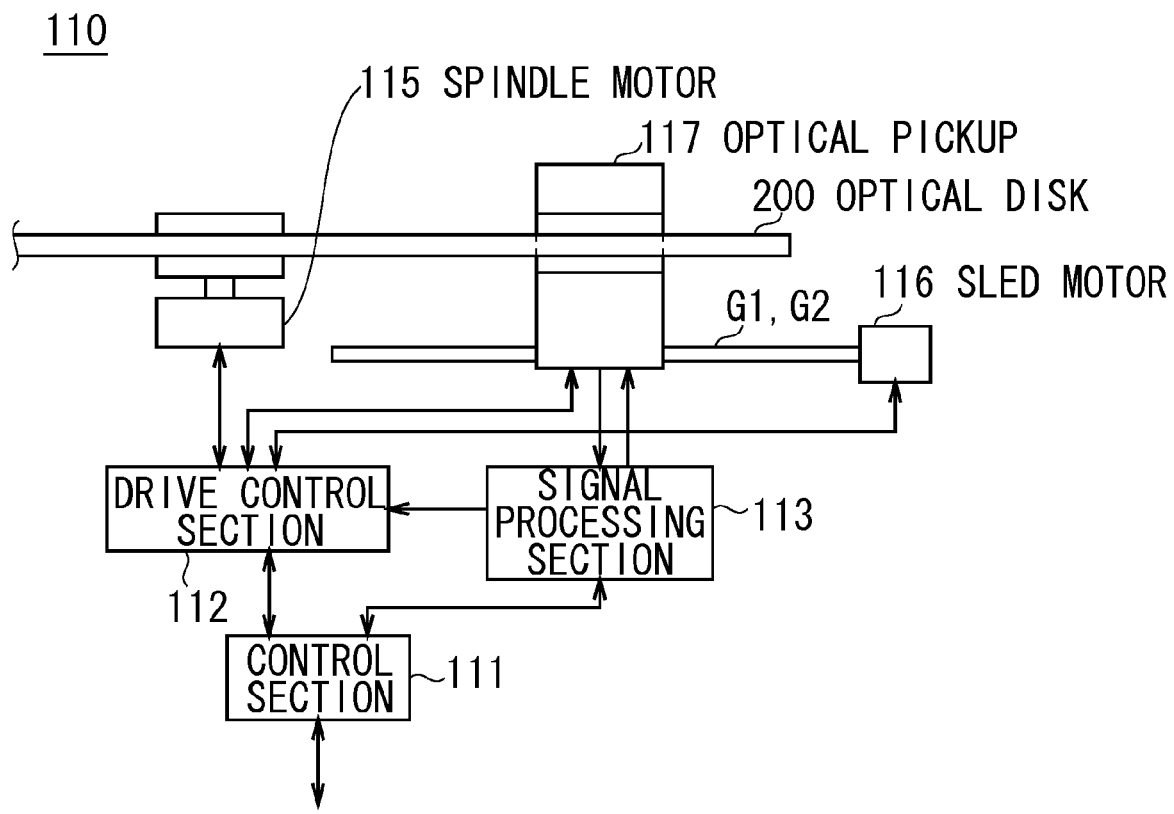
FIG. 16 is a schematic view showing the entire configuration of an optical disk apparatus according to the second embodiment.

The optical disk apparatus 110 according to the second embodiment 110 has substantially the same configuration as that of the optical disk apparatus 10 according to the first embodiment and differs only in that it includes a control section 111, a drive control section 112, a signal processing section 113, and an optical pickup 117 in place of the control section 11, drive control section 12, signal processing section 13, and optical pickup 17, as shown in FIG. 16 (corresponding to FIG. 9 of the first embodiment).

Figure 17:
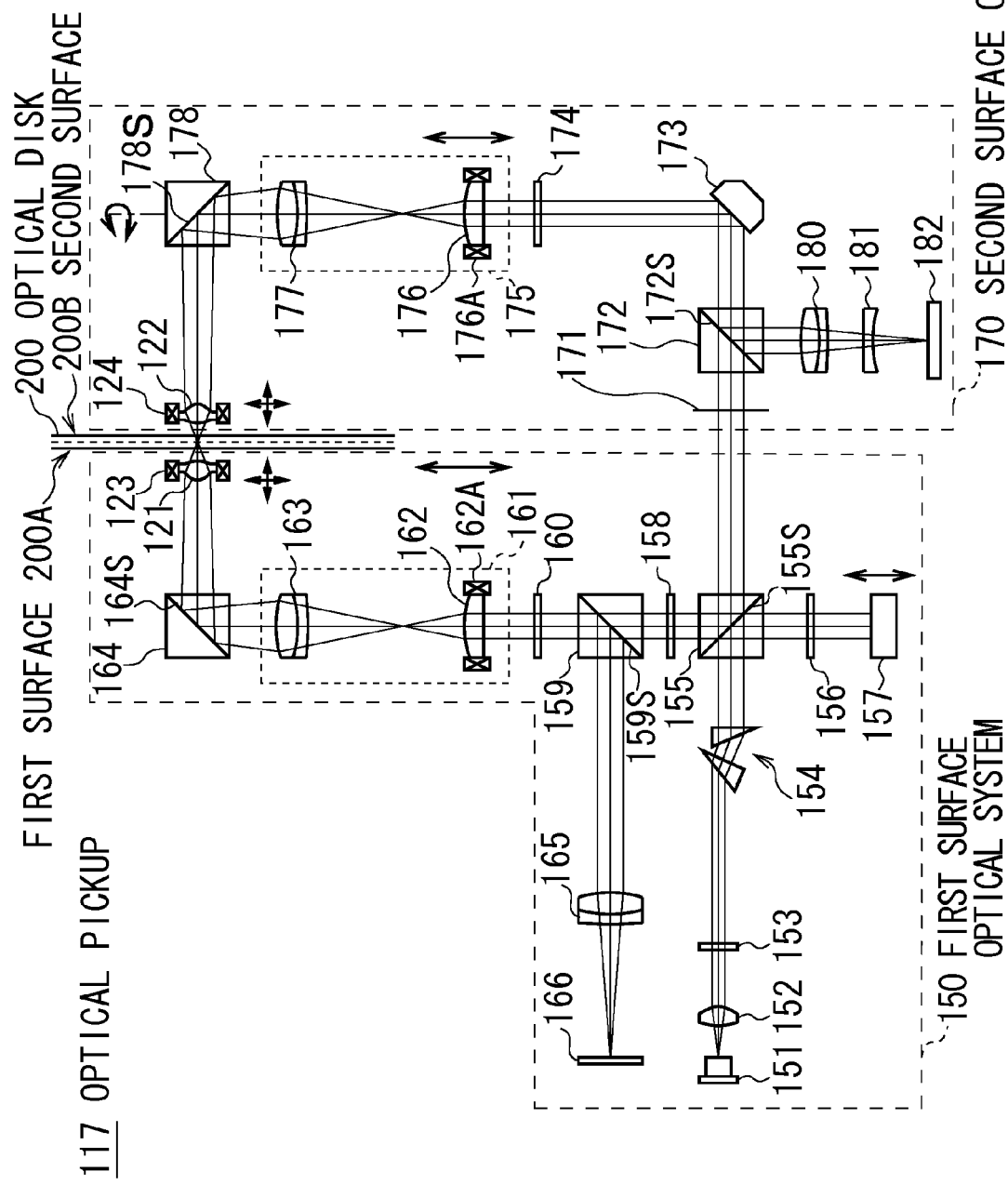
FIG. 17 is a schematic view showing a configuration of an optical pickup according to the second embodiment.

The optical pickup 117 has a large number of optical components as shown in FIG. 17 and roughly constituted by a first surface optical system 150 and a second surface optical system 170.

(2-2-1) Configuration of First Surface Optical System

The first surface optical system 150 irradiates the first surface 200A of the optical disk 200 with the information light beam LM1 and receives the information light beam LM3 emitted from the optical disk 200.

Figure 18:
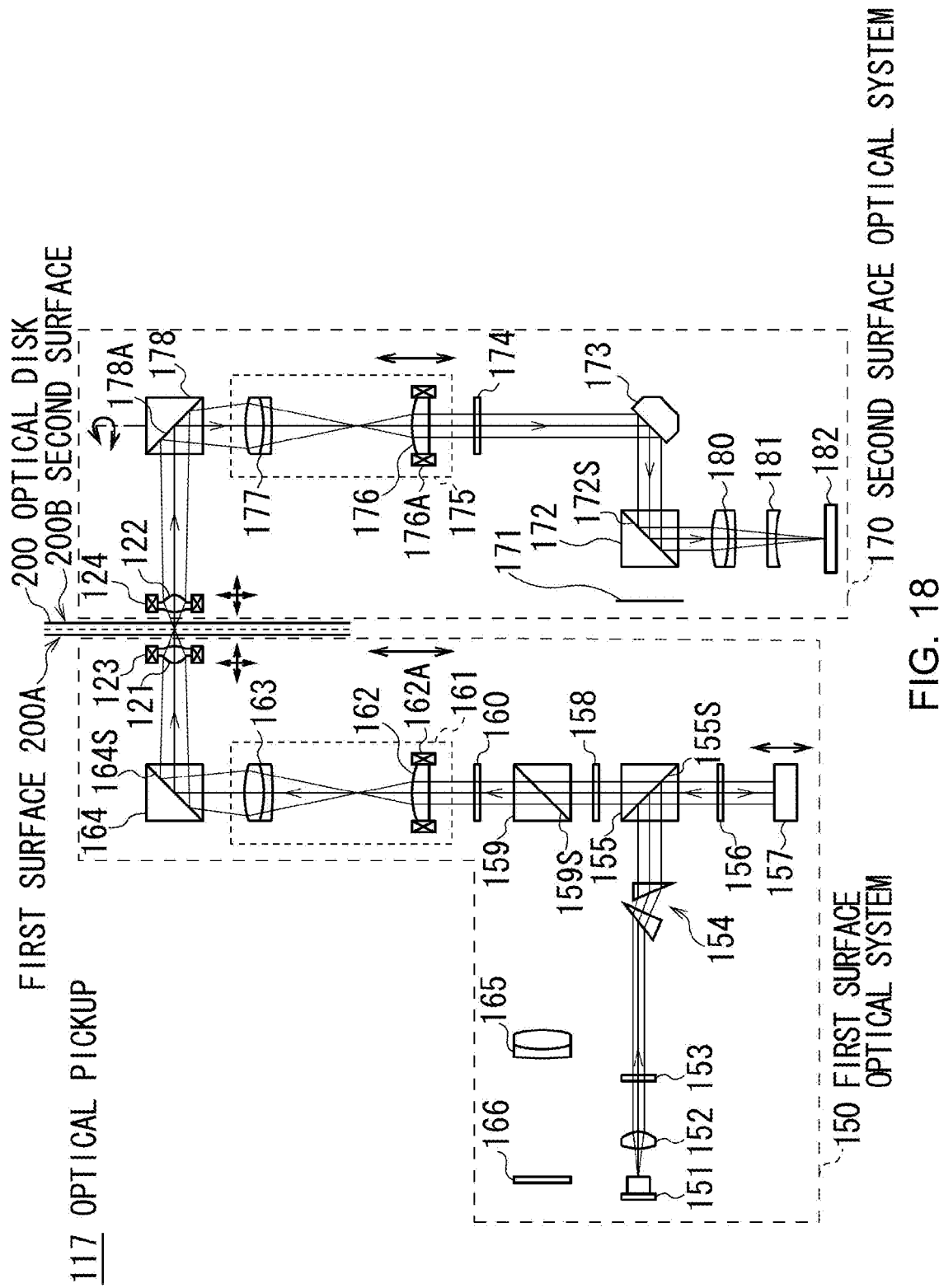
FIG. 18 is a schematic view showing an optical path (1) of a light beam in the second embodiment.

In FIG. 18, a laser diode 151 of the first surface optical system 150 can emit a blue laser light having a wavelength of about 405 nm. In practice, the laser diode 151 emits a light beam LB in the form of a diverging light under the control of the control section 111 (FIG. 16) and allows the light beam LB to enter a collimator lens 152. The collimator lens 152 converts the light beam LB from the diverging light into a parallel light and allows the parallel light to enter a ½ wavelength plate 153.

At this time, the polarization direction of the blue light beam LB is rotated by a predetermined angle by the ½ wavelength plate 153, and then the intensity distribution of the resultant blue light beam LB is corrected by an anamorphic prism 154. Then the resultant light beam LB enters a polarization beam splitter 155.

The polarization beam splitter 155 reflects or transmits the light beam at its reflecting/transmitting surface 155S in different ratios depending on the polarization direction of the light beam. For example, the reflecting/transmitting surface 155S almost reflects about 50% S-polarized light beam and transmits the remaining 50% light beam and transmits substantially 100% P-polarized light beam.

In practice, the polarization beam splitter 155 reflects about 50% light beam LB which is formed by an S-polarized light at its reflecting/transmitting surface 155S to allow it to enter a ¼ wavelength plate 156 and transmits the remaining 50% light beam LB to allow it to enter a shutter 171. Hereinafter, the light beam LB1 reflected by the reflecting/transmitting surface 155S is referred to as "light beam LB1" and light beam transmitted through the reflecting/transmitting surface 155S is referred to as "information light beam LM2".

The ¼ wavelength plate 156 converts the light beam LB1 from a linearly polarized light into a circularly polarized light and allows the resultant light beam to enter a movable mirror 157 and then converts the light beam LB1 reflected by the movable mirror 157 from a circularly polarized light into a linearly polarized light and allows the resultant light beam to enter the polarization beam splitter 155 once again.

At this time, the light beam LB1 is converted from an S-polarized light into, e.g., a left-handed circularly polarized light by the ¼ wavelength plate 156, then converted from the left-handed circularly polarized light into a right-handed circularly polarized light at the time when being reflected by the movable mirror 157, and converted from the right-handed circularly polarized light into a P-polarized right once again by the ¼ wavelength plate 156. That is, the polarization direction of the light beam LB1 at the time when the light beam LB1 is emitted from the polarization beam splitter 155 differs from that at the time when the light beam LB1 enters the polarization beam splitter 155 once again after being reflected by the movable mirror 157.

In this case, the optical pickup 117 causes the information light beam LM1 to reciprocate between the polarization beam splitter 155 and movable mirror 157 to thereby reduce the difference in the optical path length between the light beam LB1 and information light beam LM2 to a value not more than the coherent length. The position of the movable mirror 157 is controlled by the control section 111.

The polarization beam splitter 155 entirely transmits the P-polarized light beam LB1 traveling from the ¼ wavelength plate 156 through its reflecting/transmitting surface 155S and allows the light beam LB1 to enter a grating 158.

As a result, the first surface optical system 150 prolongs the optical path length of the light beam LB1 by the polarization beam splitter 155, ¼ wavelength plate 156, and movable mirror 157.

The grating 158 has a similar configuration to that of the grating 34 (FIG. 10) and diffracts the light beam LB1 to split it into the information light beam LM1 which is a zero-order diffracted light, reference light beam LE1 which is a first-order diffracted light, reference light beam LE2 which is a second-order diffracted light, and reference light beam LE3 which is a third-order diffracted light and allows them to enter a polarization beam splitter 159.

Although the information light beam LM1, reference light beam LE1, reference light beam LE2, and reference light beam LE3 travel with their optical axes slightly away from each other, they travel along substantially the same optical path.

Thus, in FIG. 18 and the like, only the optical path of the information light beam LM1 is shown and the optical paths of the reference light beams LE1 to LE3 are omitted for convenience of the explanation.

A reflecting/transmitting surface 159S of the polarization beam splitter 159 almost entirely reflects an S-polarized light beam and almost entirely transmits a P-polarized light beam. In practice, the polarization beam splitter 159 entirely transmits the information light beam LM1 and reference light beams LE1 to LE3 through its reflecting/transmitting surface 159S to allow them to enter a ¼ wavelength plate 160. The ¼ wavelength plate 160 converts the information light beam LM1 and reference light beams LE1 to LE3 from P-linearly polarized lights into right-handed circularly polarized lights and allows them to enter a relay lens 161.

The relay lens 161 has the same configuration as that of the relay lens 38 (FIG. 10) and uses a movable lens 162 to convert information light beam LM1 and reference light beams LE1 to LE3 from the parallel lights into converging lights, uses a fixed lens 163 to convert the information light beam LM1 and reference light beams LE1 to LE3 which have become diverging lights after being converged into converging lights once again, and allows the converging lights to enter a mirror 164. The information light beam LM1 and reference light beams LE1 to LE3 are then reflected by the mirror 164 to enter an objective lens 121.

The objective lens 121 condenses the information light beam LM1 and reference light beams LE1 to LE3 onto the recording layer 201 of the optical disk 200 on the first surface 200A side.

The distances between the objective lens 121 and focal points FM1 of the information light beam LM1 and focal points FE1 to FE3 of the reference light beams LE1 to LE3 in the focusing direction are determined depending on the divergence angles of the information light beam LM1 and reference light beams LE1 to LE3 emitted from the relay lens 163.

In practice, as in the case of the relay lens 38 of the first embodiment, the relay lens 161 uses a biaxial actuator 162A to control the position of the movable lens 162 so as to roughly focus the focal points FM1 and FE1 to FE3 onto the target mark layer YG.

At this time, the objective lens 121 irradiates near the existing reference track TE with the reference light beam LE2. The reference light beams LE1 and LE3 are focused onto ½-track outer peripheral side and ½-track inner peripheral side relative to the focal point FE2 of the reference light beam LE2.

Figure 19:
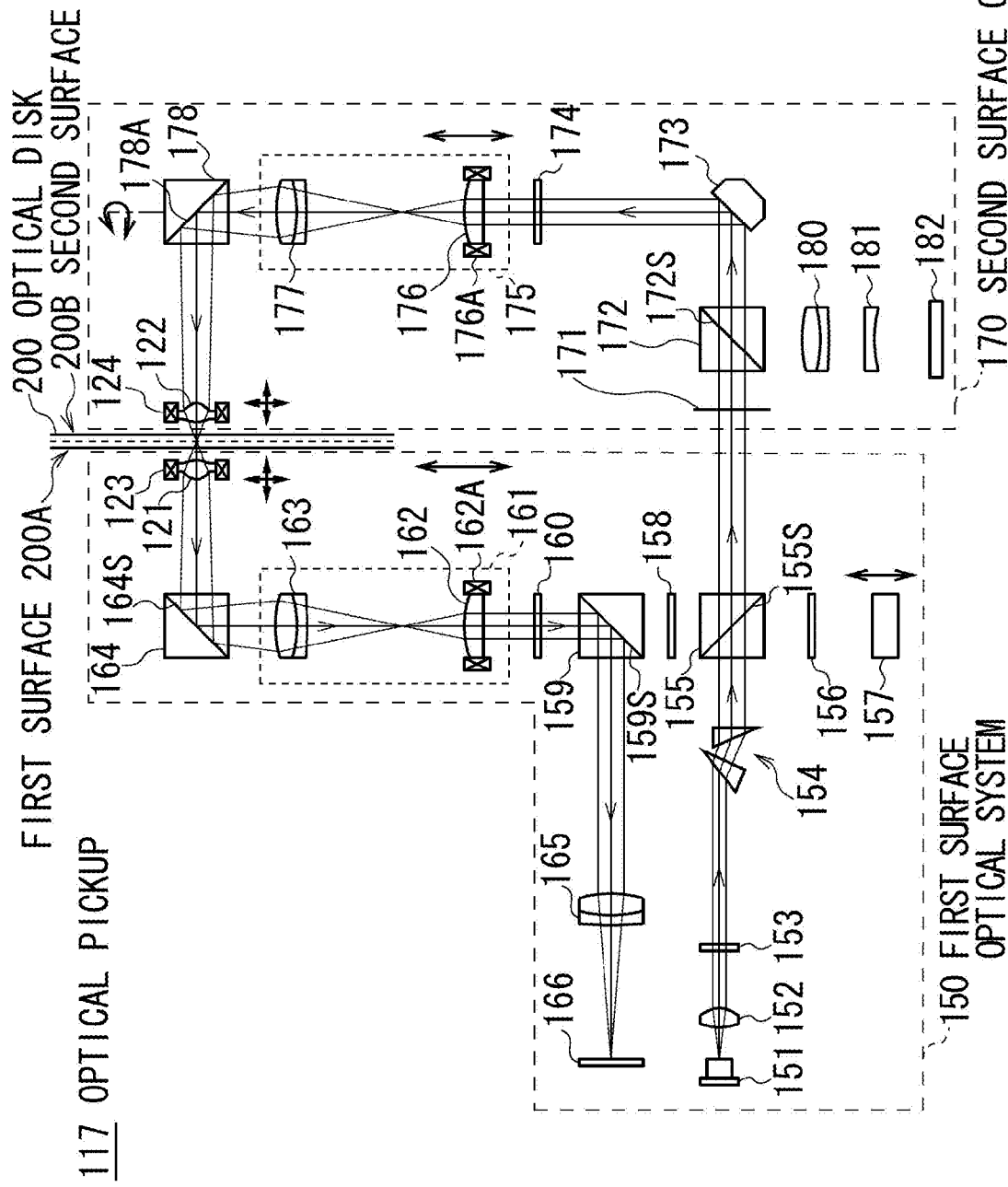
FIG. 19 is a schematic view showing an optical path (2) of a light beam in the second embodiment.

The reference light beams LE1 to LE3 are reflected at the reference track TE and its adjacent tracks and the like to be reflected reference light beams LER1 to LER3. The reflected reference light beams LER1 to LER3 travel along the optical paths of the reference light beams LE1 to LE3 in the opposite direction as shown in FIG. 19.

That is, the reflected reference light beams LER1 to LER3 are converged to some extent by the objective lens 121 and, after that, reflected by the mirror 164 to enter the relay lens 161.

Subsequently, the reflected reference light beams LER1 to LER3 are converted into parallel lights by the fixed lens 163 and movable lens 162, then converted from left-handed circularly polarized lights into S-linearly polarized lights by the ¼ wavelength plate 160, and enter the polarization beam splitter 159.

The polarization beam splitter 159 reflects the reflected reference light beams LER1 to LER3 according to the polarization direction thereof to allow them to enter a condensing lens 165. The condensing lens 165 condenses the reflected reference light beams LER1 to LER3 onto a photodetector 166.

Incidentally, the optical positions, optical characteristics, and the like of the optical components in the first surface optical system 150 are adjusted such that the focusing state obtained when the reflected reference light beams LER1 to LER3 are condensed by the objective lens 121 onto the target mark layer YG of the optical disk 200 is reflected in the focusing state obtained when the reflected reference light beams LER1 to LER3 are condensed by the condensing lens 165 onto the photodetector 166.

Figure 20:
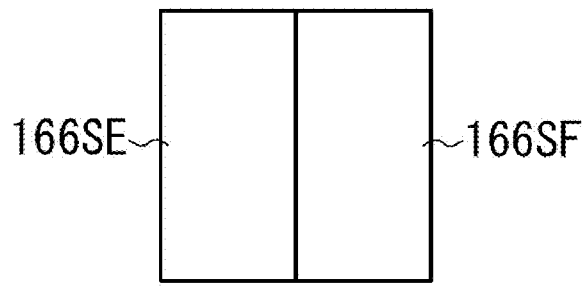
FIG. 20 is a schematic view showing a configuration of a detection area in a photodetector.
Figure 20:
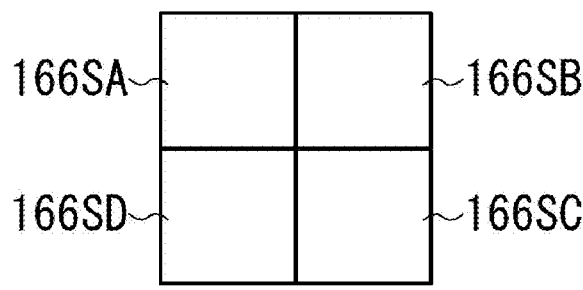
Figure 20:
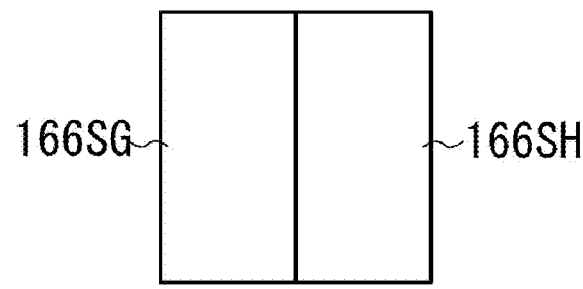
Figure 20:
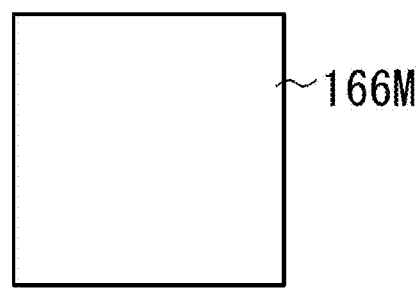

As shown in FIG. 20, the photodetector 166 has four detection area groups at its surface onto which the light beam is irradiated. In some detection area groups, substantially square-shaped detection area is divided into a plurality of sections by a dividing line along the running direction (denoted by an arrow a2) of the track or dividing line along the orthogonal direction of the track running direction.

In practice, photodetector 166 receives the reflected reference light beam LE1 at detection areas 166SG and 166SH, receives the reflected reference light beam LER2 at detection areas 166SA, 166SB, 166SC, and 166SD, and receives the reflected reference light beams LER3 at detection areas 166SE and 166SF.

The detection areas 166SA, 166SB, 166SC, 166SD, 166SE, 166SF, 166SG, and 166SH detect the light amounts of respective light beams, generates detection signals U3A, U3B, U3C, U3D, U3E, U3F, U3G, and U3H in accordance with the detected light amounts, and supplies the generated detection signals to the signal processing section 113 (FIG. 16).

The optical pickup 117 performs focus control of the objective lens 121 according to the astigmatic method. That is, the signal processing section 113 calculates a focus error signal SFE3 based on the detection signals U3A to U3D according to the following expression (5) and supplies the focus error signal SFE3 to the drive control section 112:

$$SFE3=(U3A+U3C)-(U3B+U3D) \quad (5)$$

The focus error signal SFE3 represents the amount of displacement between the focal point FE of the reference light beam LE and reference track TE (i.e., target mark layer YG) on the optical disk 200 in the focusing direction.

Further, the optical pickup 117 performs tracking control of the objective lens 121 according to the DPP method.

That is, the signal processing section 113 calculates a tracking error signal STE3 according to the following expression (6) and supplies the tracking error signal STE3 to the drive control section 112. A coefficient k is a predetermined coefficient:

$$STE3=((U3A+U3D)-(U3B+U3C))-k(U3E-U3F+\\ U3G-U3H) \quad (6)$$

Further, the signal processing section 113 generates a reproduction RF signal SRFE of the reference track TE according to the following expression (7):

$$SRFS=U3A+U3B+U3C+U3D \quad (7)$$

The signal processing section 113 performs predetermined demodulation processing, decoding processing, and the like for the reproduction RF signal SRFE of the reference track TE to thereby read out address information recorded together with information and supplies the address information to the drive control section 112 as reference track address information AS.

The drive control section 112 generates a focus drive signal SFD3 based on the focus error signal SFE3 and supplies the focus drive signal SFD3 to a biaxial actuator 123. According to the focus drive signal SFD3, the biaxial actuator 123 drives the objective lens 121 in the focusing direction so as to focus the reference light beam LE onto the reference track TE, i.e., target mark layer YG.

Further, the drive control section 112 generates a tracking drive signal STD3 based on the tracking error signal STE3 and supplies the tracking drive signal STD3 to the biaxial actuator 123. According to the tracking drive signal STD3, the biaxial actuator 123 drives the objective lens 121 in the tracking direction so as to focus the reference light beam LE onto the reference track TE.

Further, the drive control section 112 determines, based on the reference track address information AS, whether the track onto which the reference light beam LE is currently focused is a correct reference track TE, i.e., a track formed at a position away from the target track TG in the inner peripheral direction by one track width. In the case where the track onto which the reference light beam LE is currently focused is not a correct reference track TE, the drive control section 112 performs position control of the objective lens 121 on a track basis so as to focus the reference light beam LE onto the correct reference track TE.

As described above, the optical pickup 117 uses the reference light beam LE to perform position control of the objective lens 121 in the focusing and tracking directions to thereby focus the reference light beam LE onto the reference track TE of the target mark layer YG.

Figure 21:
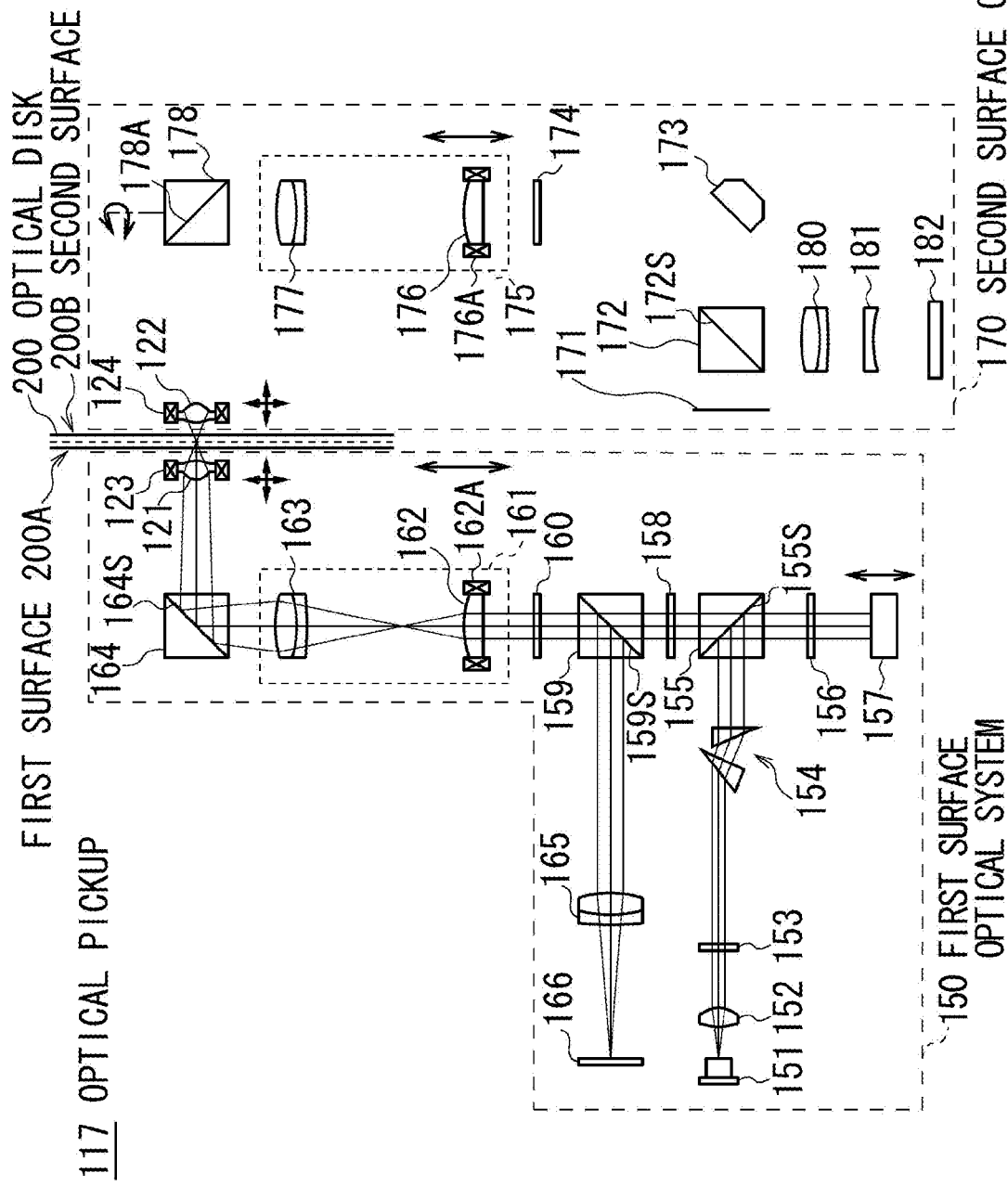
FIG. 21 is a schematic view showing a configuration of an optical path forming section according to the second embodiment.

At this time, the information light beam LM enters the objective lens 121 through the optical path forming section 120 shown in FIG. 21, allowing the focal point FM1 of the information light beam LM to be positioned at a position away from the focal point FE2 of the reference light beam LE2 in the outer peripheral direction by one track width, as described above.

That is, the focal point FM1 of the information light beam LM1 is focused onto a position away from the reference track TE of the target mark layer YG in the outer peripheral direction by one track width. At this time, the beam spots PE1 to PE3 and PM as shown in FIG. 15 are formed on the target mark layer YG.

In the case where the recording mark RM has been formed at the target position PG in the recording layer 201, when the focal point FM1 of the information light beam LM1 is focused onto the recording mark RM, the information light beam LM3 is generated from the recording mark RM due to the nature of the hologram as described above.

The generated information light beam LM3 travels along the same optical path as the reflected reference light beams LER1 to LER3 in the first surface optical system 150 and finally enters the photodetector 166.

As described above, the optical components in the first surface optical system 150 are arranged such that the reflected reference light beams LER1 to LER3 are focused onto the photodetector 166. Thus, the information light beam LM3 is also focused onto the photodetector 166.

The photodetector 166 detects the light amount of the information light beam LM3 at its detection area 166M, generates a detection signal U4 in accordance with the detected light amount, and supplies the detection signal U4 to the signal processing section 113 (FIG. 16). The detection signal U4 corresponds to the reproduction RF signal.

The signal processing section 113 performs predetermined demodulation processing, decoding processing, and the like for the detection signal U4 to thereby reproduce information recorded in the target track TG of the optical disk 200.

As described above, the first surface optical system 150 uses the objective lens 121 to condense the reference light beams LE1 to LE3 and information light beam LM and irradiates the first surface 200A of the optical disk 200 with the reference light beams LE1 to LE3 and information light beam LM. The first surface optical system 150 then receives the reflected reference beam LER1 to LER3 and information light beam LM3 and supplies the reception result to the signal processing section 113.

(2-2-2) Configuration of Second Surface Optical System

The second surface optical system 170 (FIG. 19) irradiates the second surface 200B of the optical disk 200 with the information light beam LM2 and receives the information light beam LM1 which is emitted from the first surface optical system 150 and transmitted through the optical disk 200.

As described above, the polarization beam splitter 155 of the first surface optical system 150 transmits about 50% blue light beam LB which is formed by a P-polarized light through its reflecting/transmitting surface 155S to allow it to enter the shutter 171 as the information light beam LM2.

The shutter 171 shuts out or transmits the information light beam LM2 under the control of the control section 111 (FIG. 16). When being transmitted, the information light beam LM2 enters a polarization beam splitter 172.

As the shutter 171, it is possible to use, for example, a mechanical shutter that shuts out or transmits the information light beam LM2 by mechanically moving a shut-out plate that shuts out the information light beam LM2 and a liquid crystal shutter that shuts out or transmits the information light beam LM2 by changing a voltage applied to a liquid crystal panel.

For example, a reflecting/transmitting surface 172S of the polarization beam splitter 172 transmits substantially 100% light beam of a P-polarized light and reflects substantially 100% light beam of an S-polarized light. In practice, the polarization beam splitter 172 transmits the information light beam LM2 which is formed by p-polarized light. The transmitted information light beam is reflected by a mirror 173, converted from a P-linearly polarized light into a left-handed circularly polarized light by a ¼ wavelength plate 174, and enters a relay lens 175.

The relay lens 175 has the same structure as that of the relay lens 161. The relay lens 175 includes a movable lens 176 and a fixed lens 177 corresponding to the movable lens 162 and fixed lens 163 of the relay lens 161.

The relay lens 175 uses the movable lens 176 to convert the information light beam LM2 from a parallel light into a converging light, uses the fixed lens 177 to convert the information light beam LM2 which has become a diverging light after being converged into a converging light once again, and allows the converging light to enter a galvano mirror 178.

Further, as in the case of the relay lens 161, the relay lens 175 uses an actuator 176A to move the movable lens 176 under the control of the control section 111 (FIG. 16) to thereby change the converging state of the information light beam LM2 emitted from the fixed lens 177.

The galvano mirror 178 reflects the information light beam LM2 and allows the information light beam LM2 to enter the objective lens 122. When the information light beam LM2 is reflected, the polarization direction in circularly polarized light is reversed and, for example, the information light beam LM2 is converted from a left-handed circularly polarized light into a right-handed circularly polarized light.

The galvano mirror 178 can change the angle of a reflecting surface 178A by means of a linear motor, a piezo element, or the like and can adjust the traveling direction of the information light beam LM2 by adjusting the angle of the reflecting surface 178A in accordance with the control by the control section 111 (FIG. 16).

The objective lens 122 is formed integrally with a biaxial actuator 124. Like the objective lens 121, the objective lens 122 can be moved in two axial directions, i.e., the focusing direction that is a direction toward or away from the optical disk 200 and tracking direction that is an inner peripheral side direction or outer peripheral side direction of the optical disk 200, by the biaxial actuator 124.

The objective lens 122 condenses the information light beam LM2 onto the second surface 200B of the optical disk 200. The objective lens 122 has an optical characteristic same as that of the objective lens 121. Concerning the information light beam LM2, the objective lens 122 acts as a condensing lens having a numerical aperture (NA) of 0.5 according to a relation of an optical distance or the like between the objective lens 122 and the relay lens 175.

In this case, as shown in FIG. 14, the information light beam LM2 is transmitted through the substrate 203 and focused in the recording layer 201. The focal position of the information light beam LM2 is defined by a converging state obtained at the time when the information light beam LM2 is emitted from the fixed lens 177 of the relay lens 175.

In practice, when the position of the movable lens 162 in the relay lens 161 is controlled by the control section 111 (FIG. 16) together with the position of the movable lens 176 in the relay lens 175, the second surface optical system 170 adjusts the position of the focal point of the information light beam LM2 in the recording layer 201 of the optical disk 200.

In this case, in the optical disk apparatus 110, the control section 111 (FIG. 16) adjusts the focal point FM2 of the information light beam LM2 at the time when the objective lens 122 is in a reference position to the focal point FM1 of the information light beam LM1 at the time when the objective lens 121 is in a reference position in the recording layer 201 when it is assumed that wobble or the like does not occur in the optical disk 200 (i.e., in an ideal state).

The information light beam LM2 condensed by the objective lens 121 of the first surface optical system 150 (FIG. 18) becomes a diverging light after being converged onto the focal point FM1 in the recording layer 201 of the optical disk 200, transmitted through the recording layer 201 and substrate 203, emitted from the second surface 200B, and enters the objective lens 122.

At this time, in the second surface optical system 170, the information light beam LM1 travels along the optical path of the information light beam LM2 in the opposite direction. That is, the information light beam LM1 is reflected by the galvano mirror 178 after being converged to some extent by the objective lens 122 and enters the relay lens 175. When the information light beam LM1 is reflected by the reflecting surface 178S, the polarization direction in circularly polarized light is reversed and, for example, the information light beam LM1 is converted from a left-handed circularly polarized light into a right-handed circularly polarized light.

Subsequently, the information light beam LM1 is converted into a parallel light by the fixed lens 177 and the movable lens 176 of the relay lens 175, converted from a right-handed circularly polarized light into an P-linearly polarized light by the ¼ wavelength plate 174, and then, after being reflected by the mirror 173, enters the polarization beam splitter 172.

The polarization beam splitter 172 reflects the information light beam LM1 according to the polarization direction of the information light beam LM1 and allows the information light beam LM1 to enter a condensing lens 180. The condensing lens 180 converges the information light beam LM1 and irradiates a photodetector 182 with the information light beam LM1 after giving astigmatism to the information light beam LM1 using a cylindrical lens 181.

Thus, in the second surface optical system 170, optical positions of the optical components are adjusted such that the amount of displacement of the focal point FM2 of the information light beam LM2 with respect to the focal point FM1 of the information light beam LM1 in the recording layer 201 is reflected in the irradiation state of the information light beam LM1 condensed by the condensing lens 180 and irradiated onto the photodetector 182.

Figure 22:
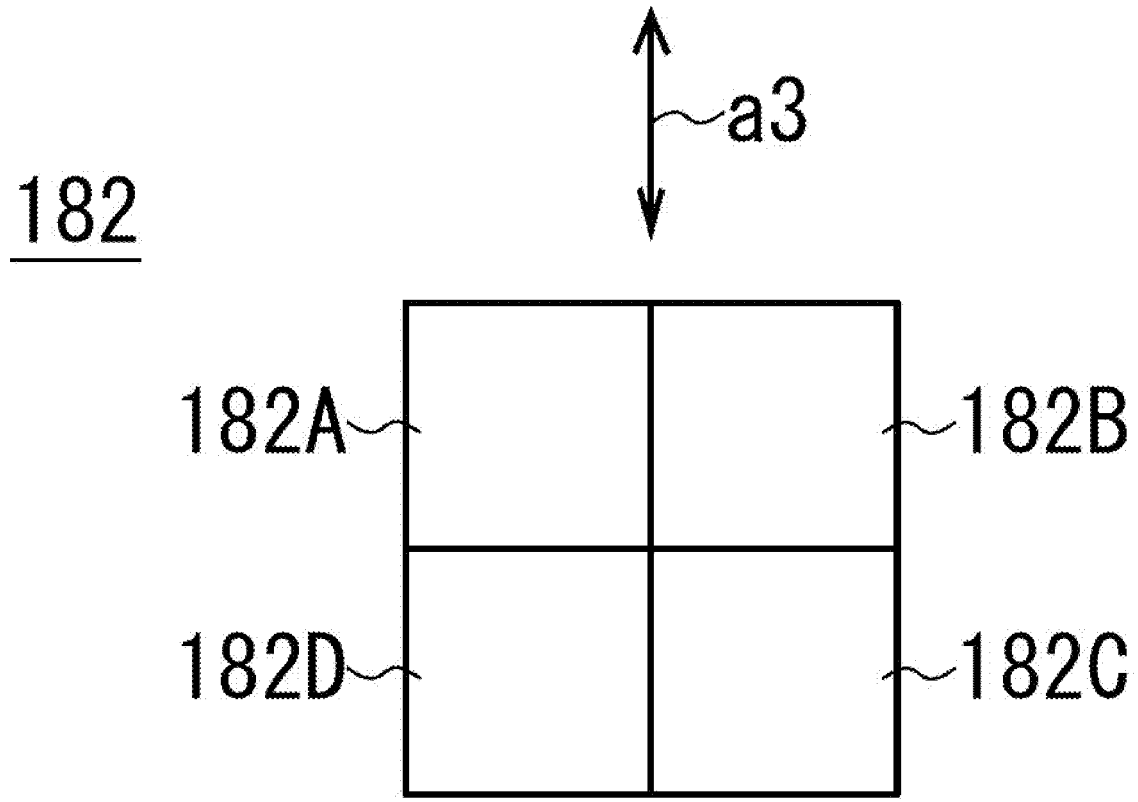
FIG. 22 is a schematic view showing a configuration of a detection area in a photodetector.

As shown in FIG. 22, the photodetector 182 has four detection areas 182A, 182B, 182C, and 182D, which are divided in a lattice shape, on the surface on which the information light beam LM1 is irradiated. A direction indicated by an arrow a3 (a vertical direction in the figure) corresponds to a traveling direction of the track at the time when the information light beam LM1 is irradiated onto the optical disk 200.

The photodetector 182 detects parts of the information light beam LM1 at its detection areas 182A, 182B, 182C, and 182D, respectively, generates detection signals U5A, U5B, U5C, and U5D (hereinafter, referred to as "U5A to U5D" collectively) according to the light amount detected at this time, and transmits the detection signals to the signal processing section 113 (FIG. 16).

The optical pickup 117 performs focus control of the objective lens 122 according to the astigmatic method.

That is, the signal processing section 113 calculates a focus error signal SFE5 based on the detection signals U5A to U5D according to the following expression (8) and supplies the focus error signal SFE5 to the drive control section 112:

$$SFE5 = (U5A + U5C) - (U5B + U5D) \qquad (8)$$

The focus error signal SFE5 represents the amount of displacement between the focal point FM1 of the information light beam LM1 and focal point FM2 of the information light beam LM2 in the focusing direction.

Further, the optical pickup 117 performs tracking control of the objective lens 122 using a push-pull signal That is, the signal processing section 113 calculates a tracking error signal STE5 based on the detection signals U5A to U5D according to the following expression (9) and supplies the tracking error signal STE5 to the drive control section 112:

$$STE5=(U5A+U5D)-(U5B+U5C) \quad (9)$$

The tracking error signal STE5 represents the amount of displacement between the focal point FM1 of the information light beam LM1 and focal point FM2 of the information light beam LM2 in the tracking direction.

The drive control section 112 generates a focus drive signal SFD5 based on the focus error signal SFE5 and supplies the focus drive signal SFD5 to a biaxial actuator 124. According to the focus drive signal SFD5, the biaxial actuator 124 drives the objective lens 122 in the focusing direction.

Further, the drive control section 112 generates a tracking drive signal STD5 based on the tracking error signal STE5 and supplies the tracking drive signal STD5 to the biaxial actuator 124. According to the tracking drive signal STD5, the biaxial actuator 124 drives the objective lens 122 in the tracking direction.

As a result, the optical pickup 117 can perform position control of the objective lens 122 so as to reduce the amount of displacement between the focal point FM1 of the information light beam LM1 and focal point FM2 of the information light beam LM2 in the focusing and tracking directions.

Further, the optical pickup 117 can perform tangential control for moving the focal point FM2 of the information light beam LM2 in the tangential direction (i.e., a tangential direction of a track) by changing the angle of the reflecting surface 178A of the galvano mirror 178.

That is, the signal processing section 113 calculates a tangential error signal SNE5 based on the detection signals U5A to U5D according to the following equation (10) and supplies the tangential error signal SNE5 to the drive control section 112:

$$SNE5=(U5A+U5B)-(U5C+U5D) \quad (10)$$

The tangential error signal SNE5 is a push-pull signal, which represents the amount of displacement between the focal point FM1 of the information light beam LM1 and focal point FM2 of the information light beam LM2 in the tangential direction.

The drive control section 112 generates a tangential drive signal SND5 based on the tangential error signal SNE5 and supplies the tangential drive signal SNE5 to the galvano mirror 178. The galvano mirror 178 adjusts the angle of the reflecting surface 178A in the tangential direction according to the tangential drive signal SND5.

In this way, the optical pickup 117 performs tangential control of the galvano mirror 178 so as to reduce the amount of displacement between the focal point FM1 of the information light beam LM1 and focal point FM2 of the information light beam LM2 in the tangential direction.

As a result, the optical pickup 117 can adjust the focal point FM2 of the information light beam LM2 to the focal point FM1 of the information light beam LM1.

The information light beam LM enters the objective lens 121 through the optical path forming section 120, allowing the focal point FM1 of the information light beam LM to be positioned at a position away from the focal point FE of the reference light beam LE in the outer peripheral direction by one track width, as described above.

That is, the focal point FM2 of the information light beam LM2 is focused onto a position (i.e., focal point FM1 of the information light beam LM1) away from the reference track TE in the outer peripheral direction by one track width in the target mark layer YG.

Thus, when recording information in the optical disk 200, the optical pickup 117 can record the recording mark RM which is a hologram as a new track while maintaining a constant interval from the existing track with high accuracy.

As described above, the optical pickup 117 according to the second embodiment performs focus control of the objective lens 121 using the reference light beam LE and tracking control of the objective lens 121 using the reference light beams LE1 to LE3 to focus the reference light beam LE2 onto the reference track TE in the target mark layer YG, thereby focusing the information light beam LM1 onto a position away from the reference track TE of the target mark layer YG in the outer peripheral direction by one track width.

(2-3) Operation and Effect

With the above configuration, the optical pickup 117 of the optical disk apparatus 110 splits, using the reflecting/transmitting surface 155S of the polarization beam splitter 155 of the optical path forming section 120, the incident blue light beam into the light beam LB1 which is formed by a P-polarized light and information light beam LM2 which is formed by an S-polarized light. Further, the optical pickup 117 diffracts, using the grating 158, the light beam LB1 to split it into a zero-order light beam, first-order light beam, second-order light beam, and third-order light beam to thereby generate the information light beam LM and reference light beams LE1 to LE3 and allow them to enter the objective lens 121.

The optical disk apparatus 110 performs position control of the objective lens 121 in the focusing and tracking direction so as to focus the reference light beam LE2 onto the reference track TE in the target mark layer YG of the optical disk 200.

At this time, according to the optical design and the like of the optical path forming section 120 in the optical pickup 117, the optical disk apparatus 110 positions the focal point FM1 of the information light beam LM1 condensed by the objective lens 121 onto a position away from the focal point FE of the reference light beam LE2 in the outer peripheral direction by one track width in the tracking direction.

Therefore, the optical disk apparatus 110 can focus the focal point FM1 of the information light beam LM1 onto a position away from the reference track TE of the target mark layer YG in the outer peripheral direction by one track width by performing position control of the objective lens 121 so as to focus the reference light beam LE2 onto the reference track TE in the target mark layer YG.

Thus, as in the case of the first embodiment, it is possible to focus the information light beam LM onto the target mark layer YG simply by focusing the reference light beam LE2 onto the reference track TE in the target mark layer YG.

Further, the optical disk apparatus 110 can fix the interval between the focal point FE2 of the reference light beam LE2 and focal point FM1 of the information light beam LM in the tracking direction to a distance corresponding to just one-track width, thereby maintaining, with higher accuracy, the interval between the existing track and a new track constant.

Further, the optical disk apparatus 110 can achieve the same effects as those described in the first embodiment.

With the above configuration, in the optical disk apparatus 110, the optical path forming section 120 of the optical pickup 117 adjusts the optical paths of the information light beam LM1 and reference light beams LE1 to LE3, and then the objective lens 121 condenses the information light beam LM1 and reference light beams LE1 to LE3. Further, the optical pickup 117 performs position control of the objective lens 121 in the focusing and tracking directions so as to focus the reference light beam LE2 onto the reference track TE in the target mark layer YG to thereby focus the focal point FM1 of the information light beam LM1 condensed by the objective lens 121 onto the target track TG in the target mark layer YG.

(3) Other Embodiments

In the first embodiment described above, the interval between the reference track TE and target track TG is set to a distance corresponding to one track width. However, the present invention is not limited to this. The interval between the reference track TE and target track TG may be set to an interval corresponding to arbitrary number of tracks.

In the first embodiment described above, the grating 34 diffracts the light beam LA to split it into the information light beam LM which is a zero-order light and reference light beam LE which is a first-order light. However, the present invention is not limited to this. Other various optical components may be used to split the light beam so as to generate the information light beam LM and reference light beam LE. Alternatively, the reference light beam LM may be emitted from a light source different from that of the information light beam LM.

In this case, it is only necessary that the optical paths of the reference light beam LE and information light beam LM in the optical path forming section 20 are formed such that the focal point FE of the reference light beam LE condensed by the objective lens 18 is focused onto a position away from the focal point FM of the information light beam LM by a distance corresponding to the total width of a predetermined number of tracks in the same mark layer Y (i.e., target mark layer YG). The wavelength of the reference light beam LE need not be the same as that of the information light beam LM, as long as the reference light beam LER can be obtained from the reference track TE. The same can be said of the second embodiment.

In the first embodiment described above, the relay lens 38 is used to control the distance from the boundary surface 101A to the focal point FM of the information light beam LM and focal point FE of the reference light beam LE. However, the present invention is not limited to this. Other various optical components may be used to control the distance from the boundary surface 101A to the focal point FM of the information light beam LM and focal point FE of the reference light beam LE. The same can be said of the second embodiment.

In the first embodiment described above, the optical path forming section 20 (FIG. 10) is constituted by the laser diode 31, collimator lens 32, grating 34, and relay lens 38. However, the present invention is not limited to this. The optical path forming section 20 may be constituted by appropriately combining various kinds of lens and various kinds of beam splitters. The same can be said of the second embodiment.

In the first embodiment described above, the light beam emitted from the laser diode 31 has a wavelength of about 405 nm. However, the present invention is not limited to this. The light beam emitted from the laser diode 31 may have any wavelength as long as the recording mark RM can be formed in the recording layer 101 by the light beam and the reflected light beam which is obtained when the light beam is reflected by the recording mark RM can be detected. The same can be said of the second embodiment.

In the above-described embodiments, a case is described where tracking control according to the push-pull method is performed in the first embodiment and tracking control according to the DPP method is performed in the second embodiment. However, the present invention is not limited to this. For example, two reference light beams LE1 and LE2 may be used to perform tracking control according to the DPP method. Alternatively, other various methods may be used to perform tracking control.

For example, in the case where the three-spot method is used, beams spots PE1 to PE3 (FIG. 15) of the reference light beams LE1 to LE3 are away from each other by a ¾ track in the tracking direction. Further, a tracking error signal is generated according to the following expression (11):

$$STE=(U3E+U3F)-(U3G+U3H) \tag{11}$$

In the first embodiment described above, the lead-in 2 (FIG. 8) is provided at the end of the lead-in area and the recording mark is recorded as data continuously from the lead-in 2 in each mark layer Y. However, the present invention is not limited to this. For example, a configuration may be employed in which the lead-in 2 is not provided and information recording is started in each mark layer Y based on only the TOC information.

In the first embodiment described above, the TOC is stored in the lead-in area. However, the present invention is not limited to this. The TOC may be stored in another location of the optical disk 100. Further, other variation information may be stored in the lead-in area.

In the first embodiment described above, the lead-in area is provided on the innermost side of the optical disk 100. However, the present invention is not limited to this. For example, when data is recorded from the outer peripheral side of the optical disk 100, the lead-in area may be provided on the outermost side of the optical disk 100.

Anyway, the lead-in mark IM of the optical disk 100 may assume various formats, as long as the lead-in marks IM are formed over a predetermined number of tracks in the radius direction of the optical disk 100 so as to function as the reference track TE and the interval between the lead-in marks IMs is set to the interval r with high accuracy.

In the first embodiment described above, position control of the objective lens 18 is performed in the focusing and tracking directions based on only the reflected reference light beam LER. However, the present invention is not limited to this. For example, the configuration as disclosed in Patent Document 1 may be employed in which a reflecting surface on which a guide grove for tracking control is provided on an optical disk, a light beam for servo control is separately irradiated onto the reflecting surface through the objective lens 18, and position control based on the reflecting light of the light beam for servo control and position control based on the reflected reference light beam LER are appropriately combined.

In the first embodiment described above, the recording layer 101 of the optical disk 100 is obtained by mixing a predetermined photopolymerization initiator in a resin material for curing. However, the present invention is not limited to this. For example, the recording layer 101 may be formed using a photopolymer, in which monomers are uniformly dispersed. In this case, when the recording layer 101 is irradiated with a light, the monomers are subjected to photopolymerization or photocrosslinking at the light irradiation portion with the result that the recording layer 101 is polymerized and, accordingly, the refractive index changes. In the recording layer 101, the location where the refractive index has changed becomes the recording mark RM.

In the first embodiment described above, the substrates 102 and 103 are provided on the optical disk 100. However, the present invention is not limited to this. For example, in the case where the recording layer 101 has a sufficient mechanical strength, one or both of the substrates 102 and 103 may be omitted. The same can be said of the second embodiment.

In the first embodiment described above, the optical disk apparatus 10 as an optical apparatus is constituted by the objective lens 18 as an objective lens, optical path forming section 20 as an optical path forming section, signal processing section 13, drive control section 12, and biaxial actuator 19 which serve as a position control section. However, the present invention is not limited to this. The optical disk apparatus may be constituted by the objective lens, optical path forming section, and position control section having various configurations.

In the first embodiment described above, the optical pickup 17 as an optical pickup is constituted by the objective lens 18 as an objective lens, optical path forming section 20 as an optical path forming section, and photodetector 45 as a reference light reception section. However, the present invention is not limited to this. The optical pickup may be constituted by the objective lens, optical path forming section, and reference light reception section having various configurations.

The present invention can also be used in an optical disk apparatus that records information such as video, music, or data for computer use in an optical disk and reproduces such information from the optical disk.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk apparatus comprising:
an objective lens that condenses, onto a uniform recording layer in an optical disk, an information light beam for recording or reproducing information in or from the optical disk on which a concentric or spiral shaped track is formed in the uniform recording layer by recording marks each representing the information and a reference light beam to be irradiated onto a reference track that has been formed on the optical disk;
an optical path forming section that forms optical paths of the information light beam and reference light beam which are allowed to enter the objective lens such that a distance between the objective lens and a focal point of the reference light beam and a distance between the objective lens and a focal point of the information light beam are equal to each other in an optical axis direction of the information light beam and that the focal points of the information light beam and reference light beam are away from each other in a radius direction of the optical disk by a distance corresponding to a total width of a predetermined number of tracks; and
a position control section that controls a position of the objective lens so as to focus the reference light beam onto the reference track, wherein
lead-in marks are previously formed in the recording layer of the optical disk, the lead-in marks indicating positions, in the optical axis direction of the information light beam, of a plurality of laminated mark layers formed by the recording marks and
when a position near the lead-in mark is set as a target position, the position control section sets the lead-in mark as the reference track and focuses the reference light beam onto the lead-in mark.

2. The optical disk apparatus according to claim 1, wherein the optical path forming section generates the information light beam and reference light beam by splitting an optical beam emitted from a predetermined light source.

3. The optical disk apparatus according to claim 2, wherein the optical forming section sets a zero-order diffracted light generated by a grating as the information light beam and sets a diffracted light of a high-order equal to or more than a first-order as the reference light beam.

4. The optical disk apparatus according to claim 1, wherein the lead-in mark indicates a recording starting position of the recording mark in each mark layer, and
when recording the recording mark in the mark layer for a first time, the position control section performs position control of the objective lens such that recording of the recording mark is started continuously from the lead-in mark.

5. The optical disk apparatus according to claim 1, wherein start address information indicating an address from which recording is performed for each mark layer is stored in the lead-in mark, and
when recording the recording mark, the position control section performs position control of the objective lens based on the start address information read out using the information light beam.

6. The optical disk apparatus according to claim 1, wherein the recording marks are sequentially recorded from an inner peripheral side of the optical disk, and
the optical path forming section forms the optical path of the reference light beam so as to focus the focal point of the reference light beam condensed by the objective lens onto the reference track formed at a position away from the target position toward the inner peripheral side by a distance corresponding to the total width of a predetermined number of tracks.

7. An optical disk apparatus comprising:
an objective lens that condenses, onto a uniform recording layer in an optical disk, an information light beam for recording or reproducing information in or from the optical disk on which a concentric or spiral shaped track is formed in the uniform recording layer by recording marks each representing the information and a reference light beam to be irradiated onto a reference track that has been formed on the optical disk;
an optical path forming section that forms optical paths of the information light beam and reference light beam which are allowed to enter the objective lens such that a distance between the objective lens and a focal point of the reference light beam and a distance between the objective lens and a focal point of the information light beam are equal to each other in an optical axis direction of the information light beam and that the focal points of the information light beam and reference light beam are away from each other in a radius direction of the optical disk by a distance corresponding to a total width of a predetermined number of tracks; and
a position control section that controls a position of the objective lens so as to focus the reference light beam onto the reference track, wherein
the optical path forming section allows at least one reference light beam to enter the objective lens, and
the position control section performs position control of the objective lens so as to focus the reference light beam onto the reference track according to a push-pull method based on a reception result of a reflected reference light beam obtained when the reference light beam is reflected by the reference track, the reception result being obtained by a plurality of light reception areas partitioned by a dividing line corresponding to a center line of the reference track.

8. An optical disk apparatus comprising:

an objective lens that condenses, onto a uniform recording layer in an optical disk, an information light beam for recording or reproducing information in or from the optical disk on which a concentric or spiral shaped track is formed in the uniform recording layer by recording marks each representing the information and a reference light beam to be irradiated onto a reference track that has been formed on the optical disk;

an optical path forming section that forms optical paths of the information light beam and reference light beam which are allowed to enter the objective lens such that a distance between the objective lens and a focal point of the reference light beam and a distance between the objective lens and a focal point of the information light beam are equal to each other in an optical axis direction of the information light beam and that the focal points of the information light beam and reference light beam are away from each other in a radius direction of the optical disk by a distance corresponding to a total width of a predetermined number of tracks; and a position control section that controls a position of the objective lens so as to focus the reference light beam onto the reference track, wherein the optical path forming section allows two or three reference light beams to enter the objective lens so as to condense the reference light beams such that they are away from each other by a ½ track in the radius direction of the optical disk, and the position control section performs position control of the objective lens so as to focus one of two or three reference light beams onto the reference track according to a differential push-pull method based on a reception result of respective reflected reference light beams obtained when the reference light beams are reflected by the reference track.

9. A position control method comprising:

an optical path forming step of forming optical paths of an information light beam for recording or reproducing information in or from an optical disk on which a concentric or spiral shaped track is formed in a uniform recording layer by recording marks each representing the information and a reference light beam to be irradiated onto a reference track that has been formed on the optical disk so as to allow the information light beams and reference light beam to enter a predetermined objective lens;

a condensing step of condensing the information light beam and reference light beam using the objective lens such that a distance between the objective lens and a focal point of the reference light beam and a distance between the objective lens and a focal point of the information light beam in an optical axis direction of the information light beam are equal to each other and that the focal points of the information light beam and reference light beam are away from each other in a radius direction of the optical disk by a distance corresponding to a total width of a predetermined number of tracks; and a position control step of controlling the position of the objective lens so as to focus the reference light beam condensed by an objective lens onto the reference track, wherein lead-in marks are previously formed in the recording layer of the optical disk, the lead-in marks indicating positions, in the optical axis direction of the information light beam, of a plurality of laminated mark layers formed by the recording marks and when a position near the lead-in mark is set as a target position, the position control step sets the lead-in mark as the reference track and focuses the reference light beam onto the lead-in mark.

10. An optical pickup comprising:

an objective lens that condenses, onto a uniform recording layer in an optical disk, an information light beam for recording or reproducing information in or from the optical disk on which a concentric or spiral shaped track is formed in the uniform recording layer by recording marks each representing the information and a reference light beam to be irradiated onto a reference track that has been formed on the optical disk;

an optical path forming section that forms optical paths of the information light beam and reference light beam which are allowed to enter the objective lens such that a distance between the objective lens and a focal point of the reference light beam and a distance between the objective lens and a focal point of the information light beam are equal to each other in an optical axis direction of the information light beam and that the focal points of the information light beam and reference light beam are away from each other in a radius direction of the optical disk by a distance corresponding to a total width of a predetermined number of tracks; and a reference light reception section that receives a reflected reference light beam which is obtained when the reference light beam is reflected by the reference track and allows a predetermined position control section to perform position control of the objective lens so as to focus the reference light beam onto the reference track based on a reception result of the reflected reference light beam, wherein lead-in marks are previously formed in the recording layer of the optical disk, the lead-in marks indicating positions, in the optical axis direction of the information light beam, of a plurality of laminated mark layers formed by the recording marks and when a position near the lead-in mark is set as a target position, the position control section sets the lead-in mark as the reference track and focuses the reference light beam onto the lead-in mark.

* * * * *